United States Patent [19]

Meier

[11] Patent Number: 5,748,619

[45] Date of Patent: May 5, 1998

[54] COMMUNICATION NETWORK PROVIDING WIRELESS AND HARD-WIRED DYNAMIC ROUTING

[76] Inventor: Robert C. Meier, 407 Sinclair Ave. SE., Cedar Rapids, Iowa 52403

[21] Appl. No.: 780,124

[22] Filed: Dec. 26, 1996

Related U.S. Application Data

[63] Continuation of Ser. No. 318,154, Oct. 4, 1994, abandoned, and a continuation-in-part of Ser. No. 59,447, May 7, 1993, Pat. No. 5,428,636, Ser. No. 270,533, Jun. 5, 1994, and Ser. No. 255,848, Jun. 8, 1994, Pat. No. 5,394,436, which is a continuation-in-part of Ser. No. 968,990, Oct. 30, 1992, abandoned, which is a continuation-in-part of Ser. No. 769,425, Oct. 1, 1991, abandoned, said Ser. No. 318,154, is a continuation-in-part of Ser. No. 238,090, May 4, 1994, abandoned, which is a continuation-in-part of Ser. No. 177,738, Jan. 4, 1994, abandoned, which is a continuation-in-part of Ser. No. 147,766, Nov. 4, 1993, abandoned, which is a continuation-in-part of Ser. No. 73,142, Jun. 4, 1993, abandoned, which is a continuation-in-part of Ser. No. 58,905, May 6, 1993, abandoned, said Ser. No. 59,447, is a continuation-in-part of Ser. No. 56,827, May 3, 1993, Pat. No. 5,295,154, which is a continuation of Ser. No. 769,425, said Ser. No. 270,533, is a continuation-in-part of Ser. No. 802,348, Dec. 4, 1991, abandoned, which is a continuation-in-part of Ser. No. 790,946, Nov. 12, 1991, abandoned.

[51] Int. Cl.⁶ ..................................................... H04K 1/00
[52] U.S. Cl. .......................... 370/278; 370/282; 370/408; 370/466
[58] Field of Search .................................. 370/315, 400, 370/401, 402, 408, 420, 492, 277, 278, 282, 285, 465, 466, 467

[56] References Cited

U.S. PATENT DOCUMENTS

| | | | |
|---|---|---|---|
| 4,975,904 | 12/1990 | Mann et al. | 370/85.1 |
| 5,179,555 | 1/1993 | Videlock et al. | 370/85.13 |
| 5,181,200 | 1/1993 | Harrison | 370/85.1 |
| 5,255,268 | 10/1993 | Cato et al. | 370/94.1 |
| 5,291,511 | 3/1994 | Maher et al. | 370/85.1 |
| 5,323,384 | 6/1994 | Norwood et al. | 370/85.1 |
| 5,331,634 | 7/1994 | Fischer | 370/85.13 |
| 5,339,316 | 8/1994 | Diepstraten | 370/85.13 |
| 5,383,187 | 1/1995 | Vardakas et al. | 370/96.3 |

FOREIGN PATENT DOCUMENTS 54-9235-A1  6/1993  European Pat. Off. .

OTHER PUBLICATIONS

Norand, "Owl Network Architecture", Appendix A, pp. 1–20, Rev. 1, Jan. 31, 1994.

Norand, "STE Network Frame Formats", Appendix B, pp. 1–11, Rev. 1, Mar. 10, 1994.

*Primary Examiner*—Douglas W. Olms
*Assistant Examiner*—Ricky Q Ngu
*Attorney, Agent, or Firm*—Stanford & Bennett, LLP

[57] ABSTRACT

A data communication network for providing dynamic routing through both wireless and wired subnetworks to support wireless communication devices and wired remote stations is disclosed. In the wireless network, the wireless communication devices can be mobile RF terminals, while the wired remote stations might be personal computers attached to a wired subnet, such as an ethernet coaxial cable. The wireless network architecture utilizes a spanning tree configuration which provides for transparent bridging between wired subnets and the wireless subnets. The spanning tree configuration provides dynamic routing to and from wireless communication devices and remote stations attached to standard IEEE 802 LANs.

29 Claims, 8 Drawing Sheets

COMMUNICATION NETWORK PROVIDING WIRELESS AND HARD-WIRED DYNAMIC ROUTING

CROSS-REFERENCE TO RELATED APPLICATION

The present application is a continuation of U.S. application Ser. No. 08/318,154, filed Oct. 4, 1994 by Robert C. Meier now abandoned, which is a continuation-in-part of U.S. application Ser. No. 08/238,090, filed May 4, 1994, by Robert C. Meier, now abandoned, which is itself a continuation-in-part of U.S. application Ser. No. 08/177,738, filed Jan. 4, 1994, by Robert C. Meier, now abandoned, which is itself a continuation in part of U.S. application Ser. No. 08/147,766, filed Nov. 4, 1993, by Robert C. Meier, now abandoned, which is itself a continuation-in-part of U.S. application Ser. No. 08/073,142, filed Jun. 4, 1993, by Robert C. Meier, now abandoned which is itself a continuation-in-part of U.S. application Ser. No. 08/058,905, filed May 6, 1993, by Robert C. Meier, now abandoned.

The present application is also a continuation-in-part of U.S. application Ser. No. 08/059,447 filed May 7, 1993 by Robert C. Meier, now U.S. Pat. No. 5,428,636, which is a continuation-in-part of U.S. Ser. No. 08/056,827 filed May 3, 1993 by Robert C. Meier, now U.S. Pat. No. 5,295,154, which is itself a continuation of U.S. application Ser. No. 07/769,425, filed Oct. 1, 1991 by Meier et al, now abandoned.

The present application is also a continuation-in-part of U.S. application Ser. No. 08/270,533 filed Jun. 5, 1994 by Robert C. Meier, which is a continuation-in-part of U.S. Ser. No. 07/802,348 filed Dec. 4, 1991 by Robert C. Meier, now abandoned, which is itself a continuation-in-part of U.S. application Ser. No. 07/790,946 filed Nov. 12, 1991 by Robert C. Meier, now abandoned.

The present application is also a continuation-in-part of U.S. application Ser. No. 08/255,848 filed Jun. 8, 1994 by Meier et al., now U.S. Pat. No. 5,394,436, which is a continuation-in-part of U.S. application Ser. No. 07/968,990 filed Oct. 30, 1992 by Meier et al., now abandoned, which is itself a continuation-in-part of U.S. application Ser. No. 07/769,425 filed Oct. 1, 1991 by Meier et al., now abandoned. Said U.S. application Ser. No. 07/968,990 is also a continuation-in-part of PCT application Ser. No. PCT/US92/08610 filed Oct. 1, 1992 by Robert C. Meier.

INCORPORATION BY REFERENCE

Applicant hereby incorporates by reference the following patent applications in their entirety:

1) U.S. application Ser. No. 08/238,090, filed May 4, 1994, by Robert C. Meier, abandoned;

2) U.S. application Ser. No. 08/177,738, filed Jan. 4, 1994, by Robert C. Meier, abandoned;

3) U.S. application Ser. No. 08/147,766, filed Nov. 4, 1993, by Robert C. Meier, abandoned;

4) U.S. application Ser. No. 08/073,142, filed Jun. 4, 1993, by Robert C. Meier, abandoned;

5) U.S. application Ser. No. 08/058,905, filed May 6, 1993, by Robert C. Meier, abandoned;

6) U.S. application Ser. No. 07/769,425, filed Oct. 1, 1991, by Meier et al., abandoned; and 7) PCT application Ser. No. PCT/US92/08610, filed Oct. 1, 1992, by Meier et al, abandoned.

BACKGROUND OF THE INVENTION

The present invention relates to a wireless and wired communication network used to maintain communication pathways among wireless communication devices and remote stations. As is well known, wired local area networks ("LANs"), such as ethernet utilizing coaxial or twisted pair cabling ("wiring"), provide communication among remote stations, such as personal computers, which are commonly wired to a wired LAN. Hereinafter, a wired LAN is referred to as a "wired subnet". To maintain communication beyond the wired range of ethernet, for example, bridging devices are employed to route information between one wired section of ethernet to another wired section. The bridging devices forward communication from one side of the bridging device onto the other, and vice versa. Smarter bridging devices are also known which keep track of the location of the remote stations so that forwarding only occurs when necessary.

As is also well known, in typical wireless communication networks, wireless communication generally occurs directly between two or more wireless terminals. To overcome transmission range limitations, such wireless networks have included wireless relaying transceivers to relay received communication, extending the range at which communication can be maintained. However, depending on the mode of wireless communication, many wireless relaying transceivers may be needed to adequately serve the network requirements.

In earlier wireless communication systems, the wireless relaying transceivers were also used to manage communication among a variety of wireless communication devices. Such relaying transceivers have been called base stations. The base station were typically connected directly to a host computer through multi-dropped connections to an ethernet communication line. To communicate between a wireless communication device and a host computer, in such a system, the wireless communication device sends data to a base station, and the base station passes the data along a hard-wired ("wired") link to the host computer.

In order to cover a larger area with a wireless communication system and to take advantage of the deregulation of the spread-spectrum radio frequencies, later-developed wireless communication systems are organized into layers of base stations. As in earlier wireless communications systems, a typical system includes multiple base stations which communicate directly with wireless terminals and the host computer.

In such wireless networks, difficulties often arise in maintaining the integrity of wireless communications. The wireless communication network must be able to handle both wireless and wired connectivity, efficient routing of data information, wireless communication device mobility, and interference from many different sources.

Customarily, wired local area networks support wireless communication devices that occupy fixed locations. Message traffic to and from such devices are routed via paths that do not change with time. Absence of a communication link to a device reflects a fault condition, i.e., a breakdown in some network component.

Thus, one object of the present invention is to route data through a wired and wireless communication network efficiently, dynamically, and without looping.

Another object of the present invention is to make the routing of data transparent to wireless terminals and remote stations located on IEEE 802.3 type subnets.

It is a further object of the present invention for the network to be capable of handling wireless communication device mobility and lost network nodes with minimal impact on the entire data communication system.

It is a still further object of the invention to allow wireless mobile computing devices, a type of wireless communication device, to move freely within wireless networks consisting of many relay nodes while transparently maintaining network connectivity with a plurality of wired subnets.

SUMMARY OF THE INVENTION

The present invention solves many of the foregoing problems using a communication network comprising two wired subnets, a wired access point connected to each of the subnets, and a plurality of intermediate wireless access points. The plurality of intermediate wireless access points provide a wireless pathway between the wired access points connected to the two subnets. Together, the two wired access points and the plurality of intermediate wireless access points form a spanning tree which interconnects the two subnets.

In another embodiment of the invention, the network may also comprise a plurality of terminal nodes which utilize the wired access points and the plurality of intermediate wireless access points to communicate on the network.

In a further embodiment of the invention, the network may also comprise a remote station attached to each of the two wired subnets. The wired access points and the plurality of intermediate wireless access points maintain communication connectivity between the two remote stations. In addition, the network may further comprise a wireless communication device which utilizes the two wired access points and the plurality of intermediate wireless access points to communicate with the two remote stations.

In a still further embodiment, the network may also comprise a third subnet and a third wired access point connected thereto. The third wired access point participates in the spanning tree, and, along with the other two wired access points and the plurality of intermediate wireless access points, communicatively interconnects the three wired subnets. The network may also comprise a plurality of wireless communication devices which utilize the three wired access points and the plurality of intermediate wireless access points to communicate with the three subnets.

The full details of the subject invention will become apparent from the following detailed description taken in conjunction with the drawings.

DETAILED DESCRIPTION OF THE INVENTION

Figure 1:
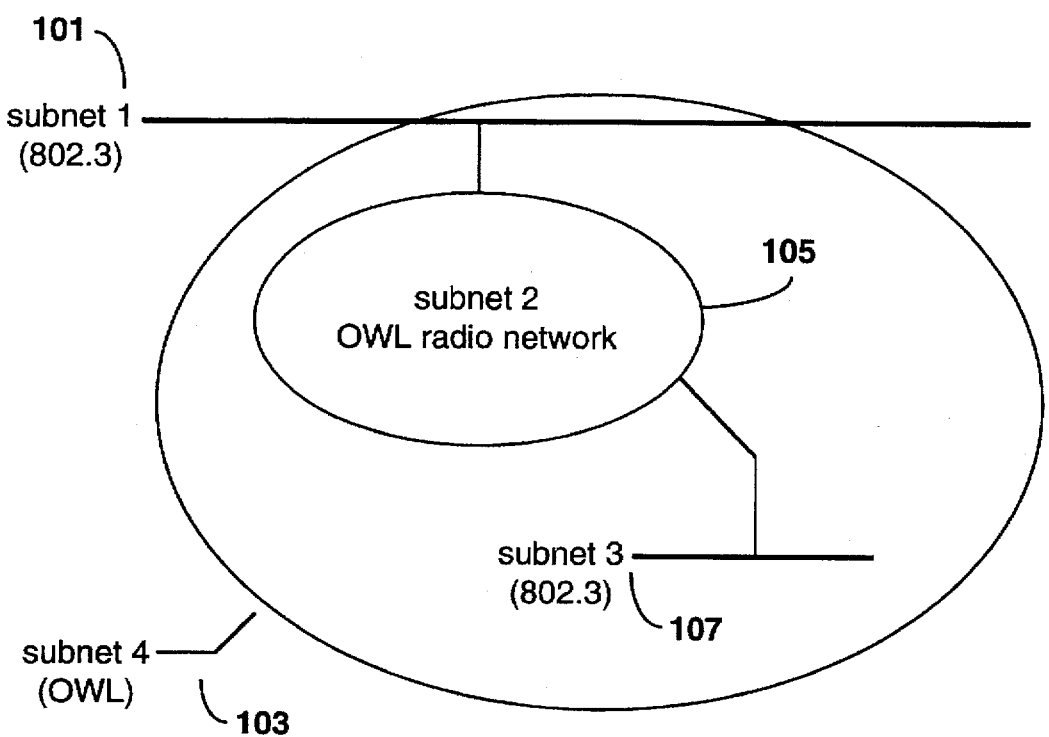
FIG. 1 illustrates the overall open wireless local area network (OWL) architecture according to the present invention.

FIG. 1 illustrates the overall open wireless local area network (OWL) architecture according to the present invention. Specifically, per IEEE (Institute of Electrical and Electronic Engineers) 802.3 Wired Local Area Network (LAN) Specifications, two subnets, a wired subnet 101 and a remote, wired subnet 107 are illustrated. The subnets 101 and 107 are wired LAN's built in accordance with the IEEE 802 specifications. According to the present invention, a third subnet, a wireless subnet 105, transparently interconnects the wired subnets 101 and 107. The wireless subnet 105 is referred to herein as an OWL radio network. Moreover, for reference herein, the wireless subnet 105 and the remote, wired subnet 107, together are referred to as an OWL subnet 103. Although, the wired subnet 101 is not part of the OWL subnet 103, it constitutes a distribution LAN for the OWL subnet 103.

Depending on the specific implementation, an OWL radio network can function (i) as a stand-alone LAN to support wireless communication between wireless communication devices, (ii) as a wireless subnet to a wired LAN to provide wireless access to and between wireless communication devices, (iii) as a wireless subnet to a wired LAN to provide access to remote wired subnets, or (iv) as a wireless subnet to a wired LAN to provide access between the wired LAN, remote wired subnets and wireless communication devices. For example, as illustrated, the wireless subnet 105 provides for communication between the wired subnet 101, the remove subnet 107, and wireless communication devices (not shown in FIG. 1) within the wireless subnet 105.

Figure 2:
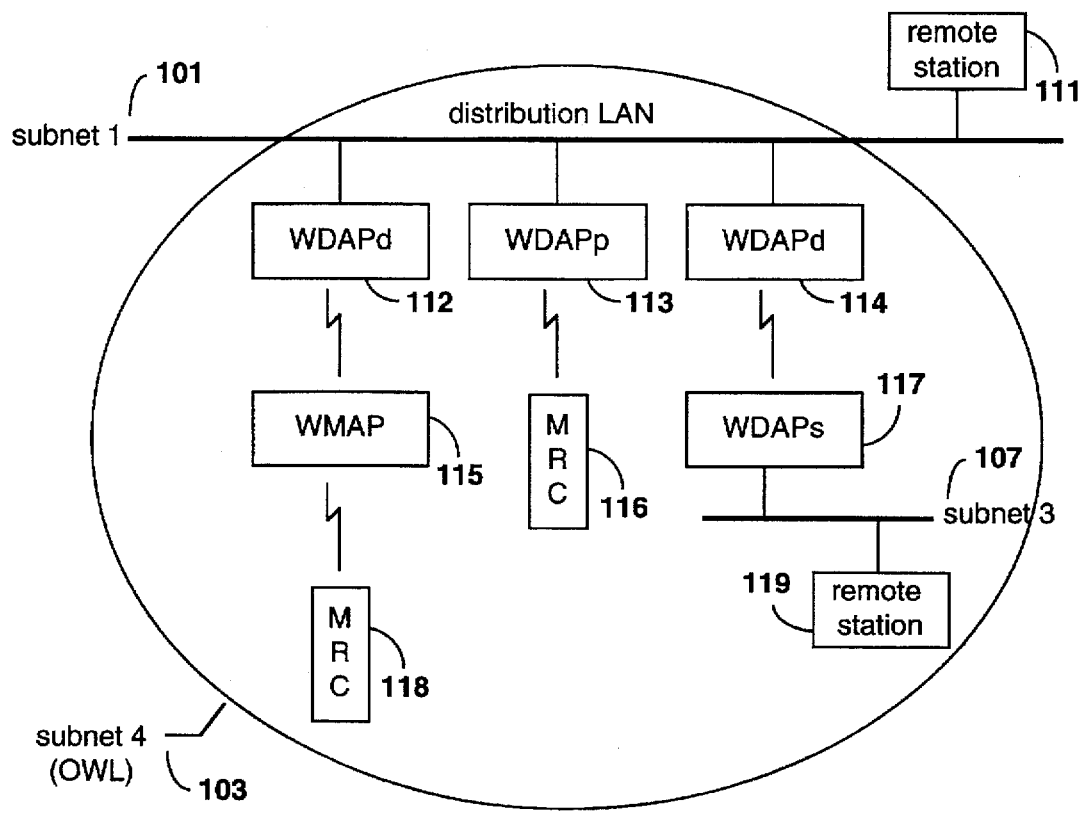
FIG. 2 shows an exemplary expanded configuration of FIG. 1, providing additional detail of the OWL radio network.

FIG. 2 shows an exemplary expanded configuration of FIG. 1, providing additional detail of the OWL radio network, the wireless subnet 105. The wireless subnet 105 provides access to the wired subnet 101, the remote wired subnet 107, and wireless communication devices, such as mobile radio-equipped computers (MRCS) 116 and 118. Other types of wireless communication devices include, but are not limited to, radio-equipped printers or other peripherals, stationary radio-equipped computers, pagers, etc. In addition, although radio frequency wireless communication is a preferred embodiment, other forms of wireless communication, such as infrared transmissions, might also be used.

The OWL radio network, such as the wireless subnet 105, provides for wireless transparent bridging via several types of wireless domain access points. In particular, each OWL subnet has a single primary wireless domain access point (WDAPp), such as the WDAPp 113. The WDAPp provides a single control point for the OWL subnet 103. The WDAPp 113 has direct access to the distribution LAN, i.e., the wired subnet 101. The WDAPp 113 forwards information, packaged in frames per IEEE 802 specification (hereinafter "802 frames"), between the wired subnet 101 and the wireless subnet 103. In addition to a WDAPp, the OWL radio network may also be configured with one or more distributed wireless domain access points. As does the WDAPp, a distributed wireless domain access point (WDAPd) provides direct access to the wired subnet 101. However, each WDAPd in the network exists within the domain of its control point, the WDAPp. For example, as illustrated, within the domain of the WDAPp 113, a WDAPd 112 and a WDAPd 114 can be found. The WDAPd 112 and the WDAPd 114 forwards 802 frames between the wired subnet 101 and the OWL subnet 103.

As previously stated, an OWL subnet may also include wired subnets other than, and remotely located from, the distribution LAN, i.e., the wired subnet 101. For example, the wired subnet 107 represents one such remote wired subnets. Although only one is illustrated, many such remote wired subnets may exist in an OWL subnet 103.

Associated with each remote wired subnets, a secondary wireless domain access point (WDAPs) can be found. Each WDAPs serves as a bridge between a remote wired subnet and the OWL radio network. For example, a WDAPs 117 serves as a bridge between the remote wired subnet 107 and the wireless subnet 105. Thus, the WDAPs 117 forwards 802 frames between the remote wired subnet 107 and the wireless subnet 105.

As illustrated, a remote station 119 directly participates in the remote wired subnet 107 in conformance with IEEE 802 specifications. A remote station 111 similarly participates in the wired subnet 101. Each of the remote stations and wireless communication devices constitute "network nodes" in the OWL architecture. Moreover, any network node can freely communicate with any other network node. For example, the remote station 111 can freely intercommunicate with the remote station 119, MRC 116 and MRC 118. Similarly, the MRC 116 can communicate with the MRC 118 and the remote stations 111 and 119.

Wireless media access points are also used in the OWL radio network where needed. A wireless media access point (WMAP), such as a WMAP 115, is a radio equipped base station which extends the wireless coverage area of a OWL radio network, such as the wireless radio network 103, to support larger wireless coverage areas than might be desirable without the use of one or more WMAP's. A typical OWL radio network has multiple WMAP's with overlapping coverage areas. Thus, MRC's can roam between coverage areas and maintain network connectivity.

Figure 3:
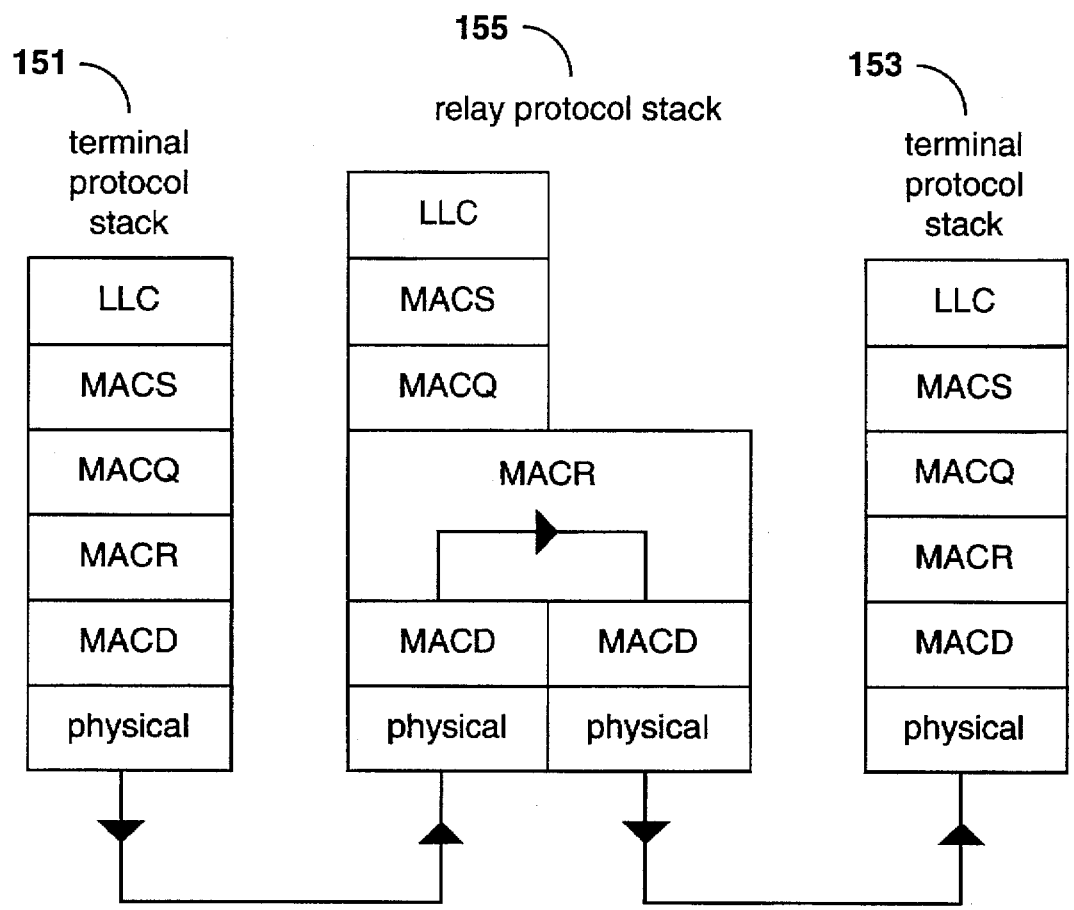
FIG. 3 illustrates the MAC protocol stacks used in an exemplary configuration of the present invention to provide for communication between two terminal nodes via a relay node.
Figure 4:
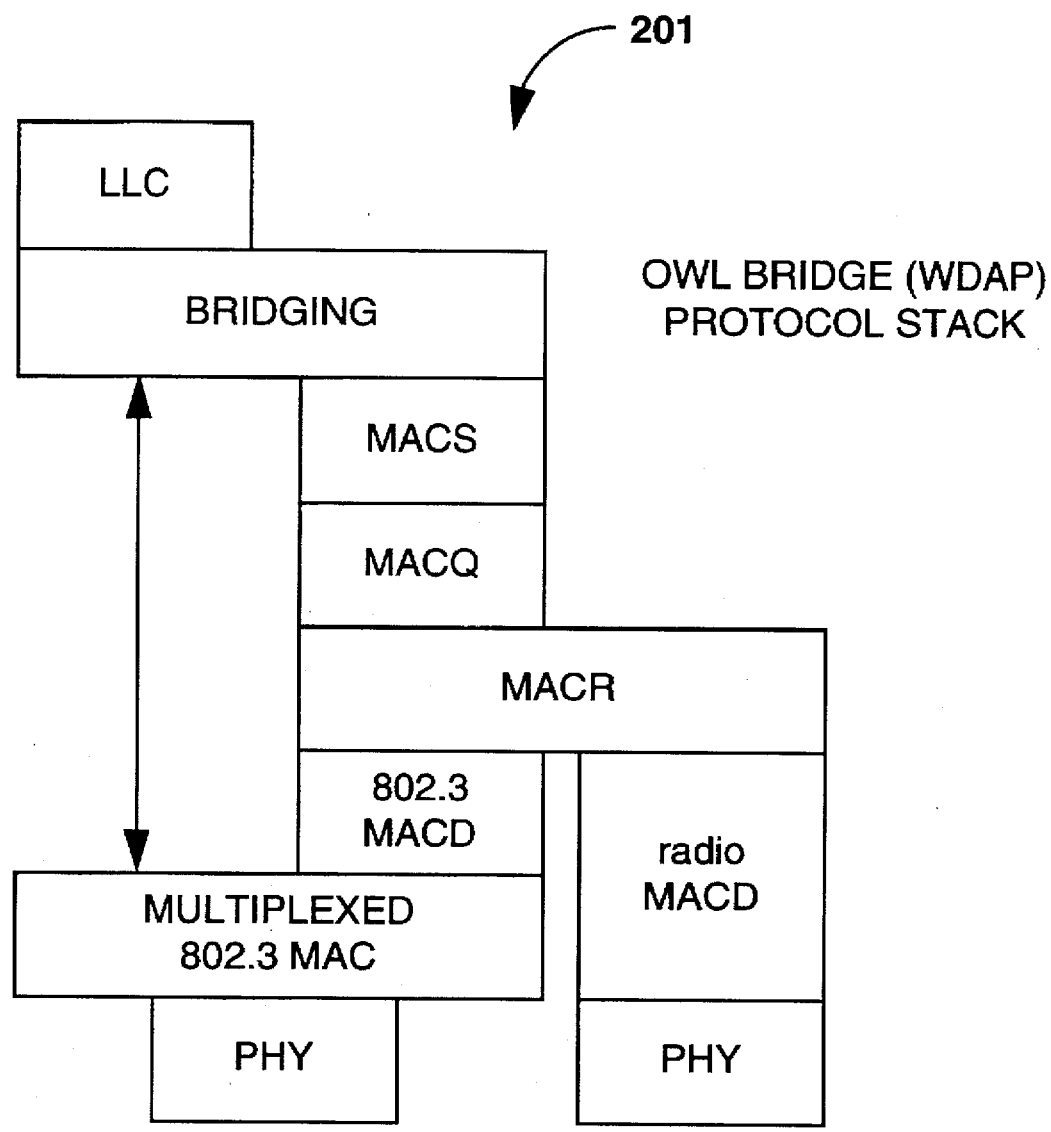
FIG. 4 illustrates an OWL bridge protocol stack used by each wireless domain access point (WDAP), an OWL bridge, to bridge the OWL radio network with an 802 type wired subnet, in an embodiment according to the present invention.
Figure 5:
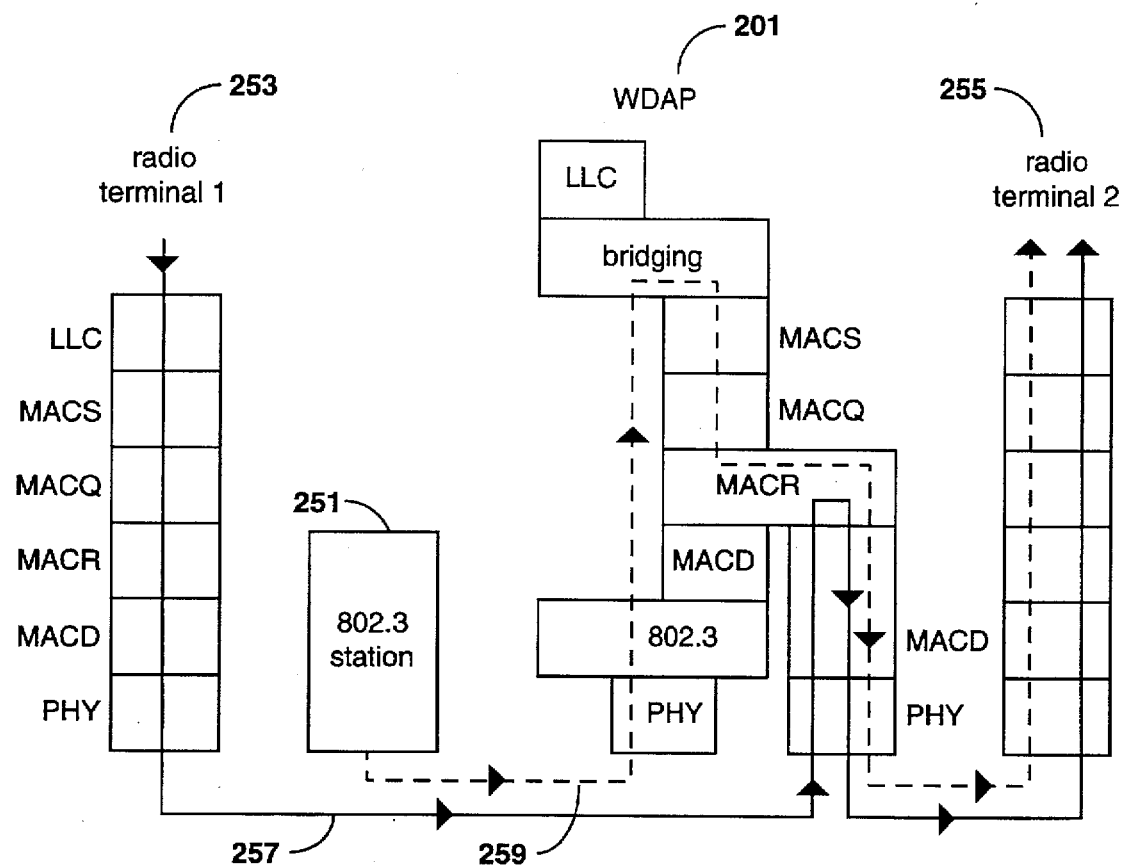
FIG. 5 is a data flow diagram illustrating how data flows through the bridge protocol stack of FIG. 4.

FIGS. 3-5 illustrates OWL protocol stacks according to the present invention which are contained in the MAC sub layer of a standard ISO protocol stack. In particular, an OWL MAC provides MAC sub layer services to the LLC sublayer of the ISO data link layer. The OWL MAC is subdivided into MAC-D, MAC-R, MAC-Q and MAC-S sublayers. The MAC-D sublayer is analogous to the data link layer in the ISO protocol stack. The MAC-D layer provides data link services to the MAC-R layer. It is responsible for channel access control and the reliable transmission of the MAC-R sublayer is analogous to the network layer in the ISO protocol stack. The MAC-R layer provides routing services to the MAC-Q layer. It is responsible for correctly routing information through the OWL subnet, which may include multiple hops and circular physical paths. Such information is formatted into MAC-R protocol data units (PDUS) for routing. The MAC-Q sublayer adds reliability to the radio network by retransmitting lost PDUs. The MAC-Q layer is responsible for discarding out-of-sequence and duplicate PDUs. The MAC-Q sublayer can be implemented as an entity in the MAC-R sublayer. The MAC-Q entities exist at entry points to the radio network. The MAC-S sublayer is responsible for providing services for security, compression, etc. The MAC-S entities exist at entry points to the OWL radio network.

As referred to herein, logical OWL nodes are MAC-R addressable entities in the OWL radio network. The logical OWL nodes functional entities which can be contained within the various network devices. A logical OWL node can be either a terminal node or a relay node. The terminal nodes are end points in the network. The MRC's 116 and 117 contain terminal nodes, i.e., an MRC contains the logical functionality of a terminal node. Relay nodes forward PDUs at the MAC-R sublayer. The WMAP 115, for example, contains a relay node.

FIG. 3 illustrates the MAC protocol stacks used in an exemplary configuration to provide for communication between two terminal nodes via a relay node. Each terminal node in the network contains a terminal protocol stack which defines the terminal node as a network end-point. Each relay node in the network also contains a protocol stack, the "relay protocol stack", which defines the relay node as a PDU forwarding entity.

For example, as illustrated, two terminal nodes may communicate with each other via a relay node. The arrows shown represent the flow of data from a first terminal node (using a terminal protocol stack 151) to a second terminal node (using a terminal protocol stack 153) via a relay node (using a relay protocol stack 155). The upper layers of the relay protocol stack 155 are used to process PDUs addressed to the relay node.

FIG. 4 illustrates another type of protocol stack used in the network. An OWL bridge protocol stack 201 is illustrated which is used by each wireless domain access point (WDAP), an OWL bridge, to bridge a wireless subnet to an 802 type wired subnet. Each bridge protocol stack, such as bridge protocol stack 201, contains a relay protocol stack. In addition, the 802.3 MAC-D sublayer is used to send OWL PDUs over an 802.3 link that is part of the OWL radio network. The MAC-Q and MAC-S sublayers serve as proxy MAC-Q and MAC-S entities for stations, such as the remote stations 111 and 119 (FIG. 2), on the 802.3 subnet. For convenience, the MAC-Q and MAC-S sublayers also service PDUs for the local WDAP 802 address.

FIG. 5 illustrates how data flows through the bridge protocol stack of FIG. 4. A dashed line 259 represents the path a PDU takes as it travels from a station 251 on an 802.3 LAN to a terminal 255 in the OWL radio network. A WDAP, using the bridge protocol stack 201, bridges the PDU from the 802.3 subnet to the radio subnet. A solid line 257 represents the path a PDU takes as it travels from a terminal 253 to the terminal 255 wherein both terminals are in the radio network. In this example, because the path is contained in the radio network, the PDU does not have to be bridged.

In general, PDUs are bridged across subnet boundaries, and PDUs are routed within the radio network. A bridging entity in a WDAP uses a forwarding database to determine if a PDU should be bridged from one subnet to another subnet. A forwarding database contains a list of 802 addresses associated with each subnet to which the WDAP is attached. A MAC-R entity uses a routing table to determine how a PDU should be routed within an OWL subnet.

Further detail regarding this embodiment can be found in the attached Appendices A and B. Appendix A provides further detail regarding the OWL network architecture, while Appendix B describes the network frame formats used in communication exchanges.

Figure 6:
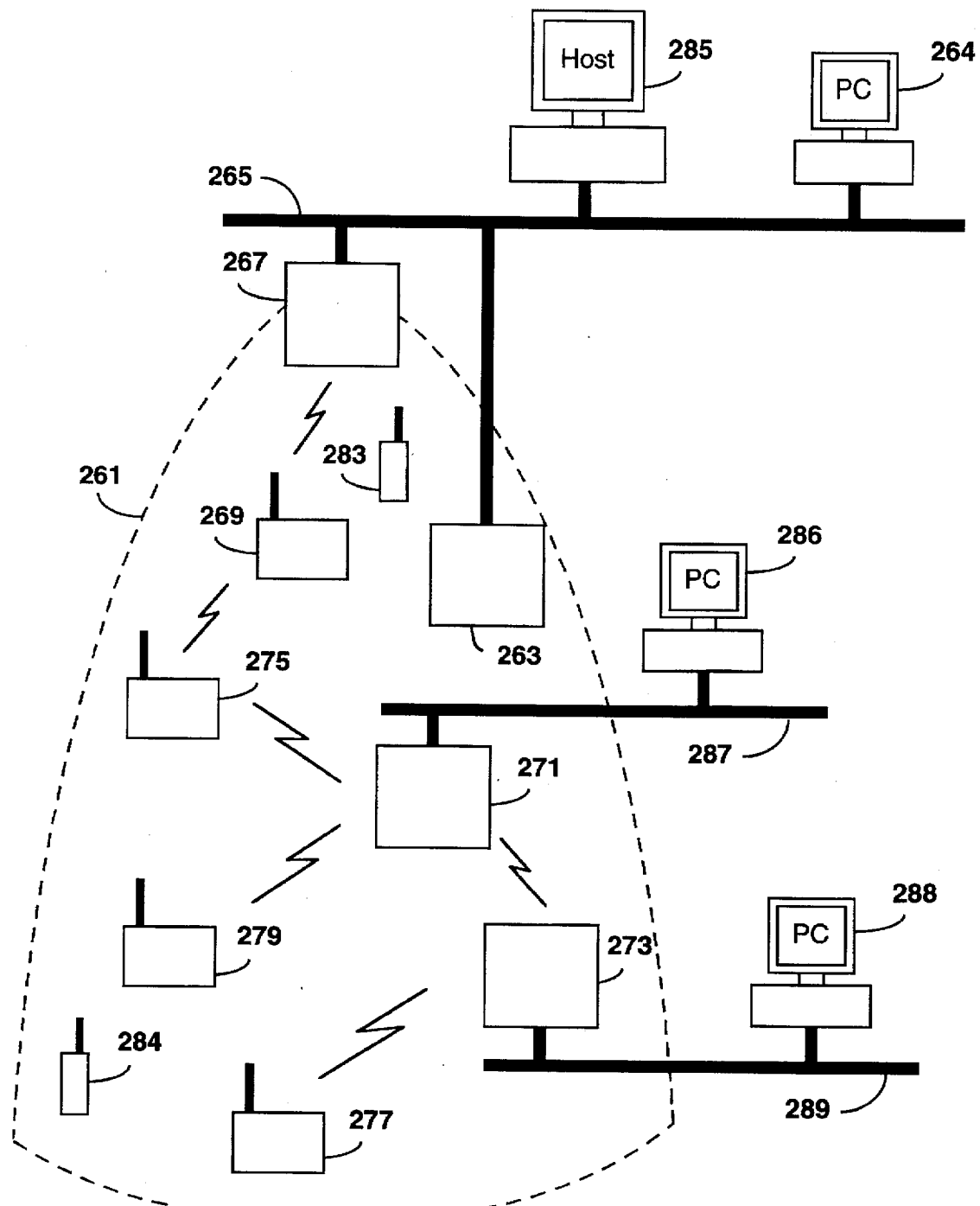
FIG. 6 illustrates an exemplary configuration of the OWL architecture according to one embodiment of the present invention.

FIG. 6 illustrates an exemplary configuration of the OWL architecture according to the present invention. Therein, a wired subnet 265 and remote wired subnets 287 and 289, are configured in accordance with IEEE 802 standards. A WDAPp 267, utilizing the bridging protocol stack shown in FIG. 4, acts as a spanning tree root node, providing access between an OWL radio network 261 and the wired subnet 265. Note that a WDAPd 263 is also illustrated which uses a bridging protocol stack. The WDAPd 263 could instead be used as the root of the spanning tree (becoming the network WDAPp) should the WDAPp break down. In addition, two exemplary remote stations, a host computer 285 and a personal computer 264, are connected to the wired subnet 265.

A WDAPs 271 constitutes an access point to and from the remote wired subnet 287. Similarly, a WDAPs 273 constitutes an access point to and from the remote wired subnet 289. Both WDAPs's utilize the bridge protocol stack of FIG. 3. Moreover, each remote wired subnet 287 and 289 illustrate the participation of a remote station, a personal computer 286 and 288, respectively. Also, wireless communication devices, such as an MRC 283 and an MRC 284, can move through the OWL radio network 261 while maintaining network connectivity. Any wireless communication device can communicate with any other wireless communication device or with any remote station. Similarly, any remote station can communicate with any other remote station or with any wireless communication device.

A plurality of intermediate wireless access points, i.e., the WMAP's 269, 275, 277 and 279, along with the wired access points, i.e., the WDAP's 267, 263, 271 and 273, providing for communication among any of the remote stations and wireless communication devices. Because WDAP's are wired to corresponding wired subnets, they are referred to herein as a "wired access points" even though WDAP's also participate wirelessly within the OWL radio network. Specifically, the plurality of intermediate wireless access points and the wired access points, together, form a spanning tree which provides for routing through the OWL radio network.

Specifically, nodes in an OWL radio network are organized into a network spanning tree. A WDAPp serves as a root of the spanning tree, while PDU's are routed along branches of the spanning tree. Routing toward the root is referred to herein as "downstream" routing. Routing away from the root is referred to as "upstream" routing. Referring to FIG. 6, the WDAPp 267 constitutes the root of the spanning tree formed within the OWL radio network 261. Communication flowing upstream, away from the WDAPp 267, might include a plurality of relay points along the way to reach a destination. For example, to reach the personal computer 286, data from the personal computer 264 first travels along the wired subnet 265 to the root of the spanning tree, i.e., to the WDAPp 267. The WDAPp 267, using a spanning tree routing table, identifies that the WMAP 269 is the next relay point upstream to the personal computer 286. Therefore, the WDAPp 267 forwards the data upstream to the WMAP 269. Upon receipt, the WMAP 269 similarly identifies the WMAP 275 and forwards the data upstream. In turn, the WMAP 275 forwards the data to the WDAPs 271. Finally, the WDAPs 271 relays the data along the remote wired subnet to the personal computer 286.

A spanning tree, which provides the data pathways throughout the OWL radio network, is stored and maintained by each participant in the OWL radio network. Each network node stores and modifies information which specifies how local communication traffic should flow. Optimal spanning trees assure efficient, adaptive (dynamic) routing of information without looping.

Nodes in the OWL radio network are generally categorized as being attached or unattached to the network spanning tree. Upon initialization of an OWL radio network, only the root node is attached. A single WDAP can be designated to contain the root node, or multiple root candidates can negotiate to determine which node assumes the root status. Once the root is designated, the WDAP containing the root node, i.e., the WDAPp, begins periodically broadcasting messages offering attachment. These messages are referred to as "HELLO response PDU's". Unattached nodes, i.e., other WDAP's or WMAP's, receiving the Hello response PDU's may attach to the OWL radio network via the WDAPp. With the exception of terminal nodes, each network node that becomes attached also begins periodically transmitting Hello response PDU's. The nodes receiving Hello response PDU's from newly attached nodes may attach to the network via the newly attached nodes. This process continues until all of the network nodes are attached. Moreover, to attach to the network, an "Attach request PDU" must be sent and relayed downstream toward the root node. In response, the root sends an "Attach response PDU" back through the network to confirm the attachment. Upon receiving the Attach request PDU, each network node places an entry in a spanning tree routing table indicating the identity of both the requesting node and the node which last transmitted (relayed) the request. In this manner, routing tables can be constructed and maintained. As described in the Appendix A, other types of PDU's, i.e., Registration or Data request PDU's, are also be used to create and modify routing tables.

Using the spanning tree routing table, any network node can determine whether any other network node exists upstream or not. In particular, if an entry exists, the destination node must have previously sent a PDU (possibly the Attach request PDU) through that relay node in a downstream pathway to root node. Thus, if the entry exists, the relay node routes the PDU upstream per routing table instruction toward the destination node. However, if no entry for the destination node exists, the relay node can not determine the location of the destination node. Therefore, the relay node sends the PDU downstream toward the root node. If any node along the downstream pathway identifies the destination node in its routing table, that node relays the PDU upstream toward the destination. More detail regarding this entire procedure can be found in Appendix A, for example at pages 17–22.

Figure 7:
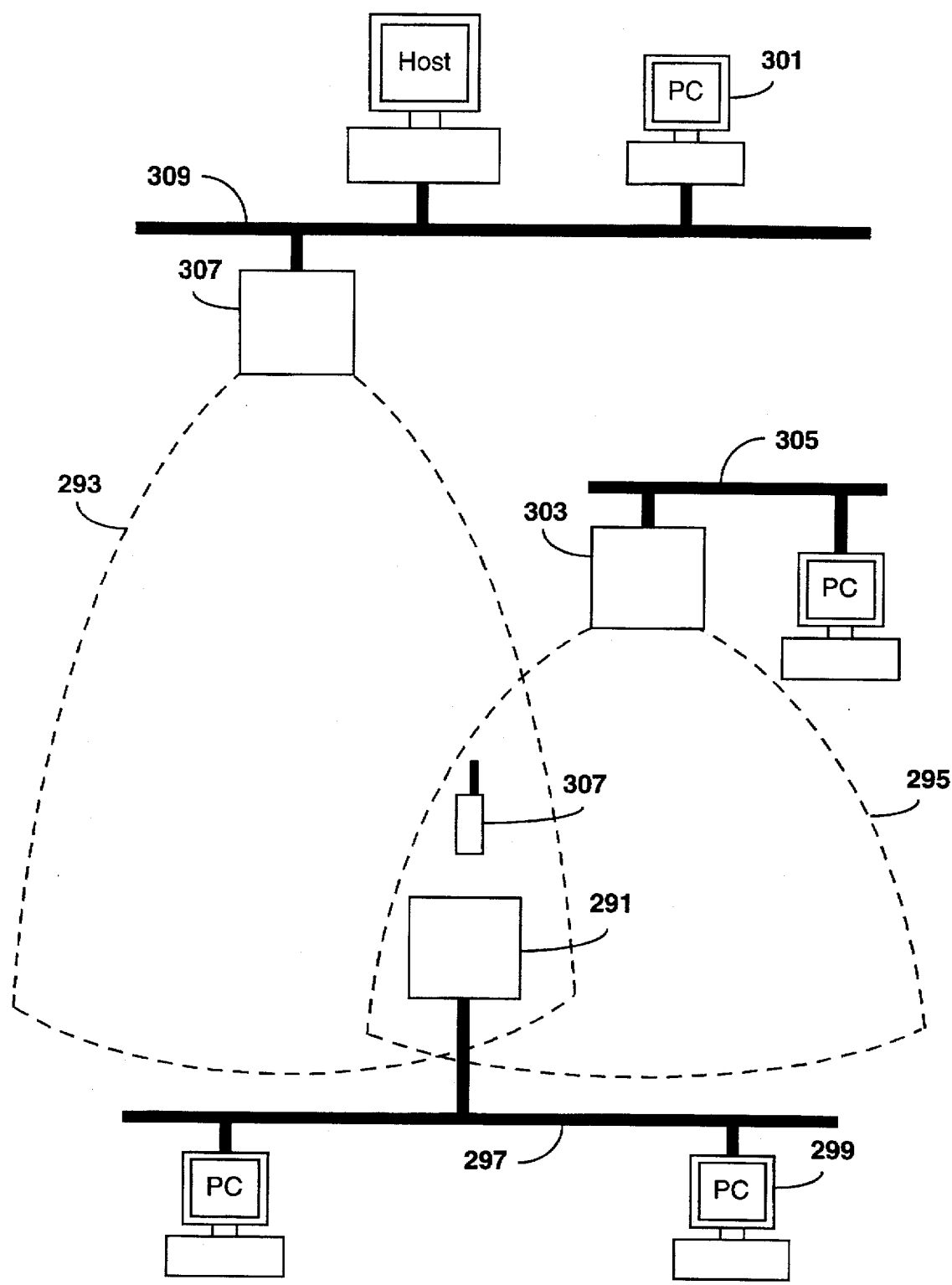
FIG. 7 illustrates an alternate embodiment of the present invention wherein a WDAPs participates in more than one OWL radio network.

FIG. 7 illustrates an alternate embodiment of the present invention wherein a WDAPs 291 participates in more than one OWL radio network. Specifically, the WDAPs 291 participates in OWL radio networks 293 and 295. For example, a personal computer 299 initiates communication to another remote station, a PC 301, by transmitting a message upon a wired subnet 297. Upon receiving the message, the WDAPs 291 checks its routing table and, because no entry is found, routes the message downstream through both the OWL radio networks 293 and 295. When the upstream routing in the OWL network 295 reaches a WDAPp 303, an entry for the personal computer 301 is still not found. Therefore, the WDAPp 303 unicasts the message onto a wired subnet 305. Because the PC 101 does not reside on the subnet 305, the message reaches a dead-end and is ignored. However, when the message reaches a WDAPp 307, and the WDAPp 307 does not find an entry for the personal computer 301, it unicasts the message onto a wireless subnet 309 for receipt by the personal computer 301.

Figure 8:
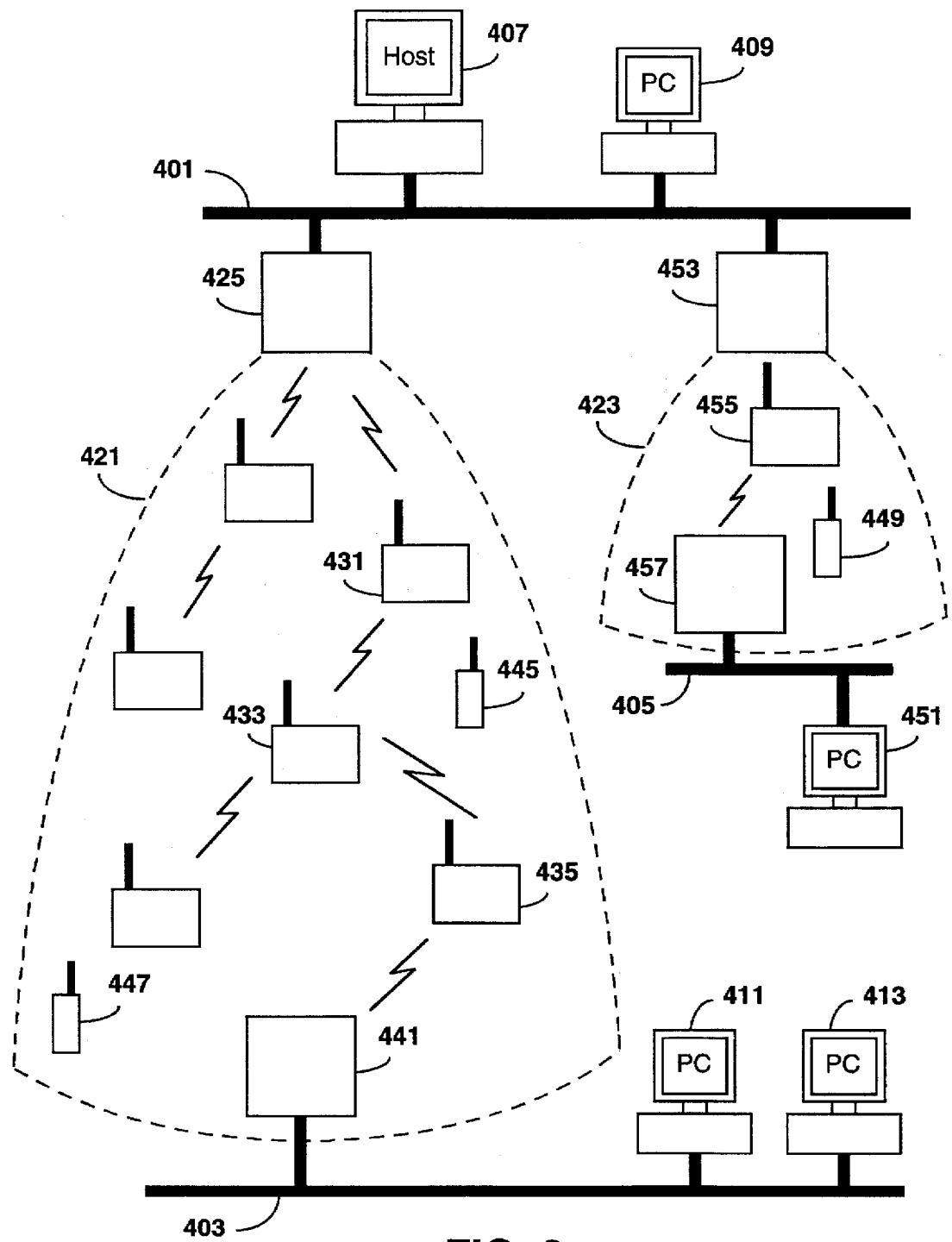
FIG. 8 is a diagram illustrating yet another variation of the OWL architecture according to another embodiment of the present invention wherein two OWL radio networks are used.

FIG. 8 is a diagram illustrating yet another variation of the present invention wherein two OWL radio networks are used. Specifically, a WDAPp 425 provides access for communication between a wired subnet 401 and a remote wired subnet 403. Utilizing a spanning tree configuration, the plurality of intermediate wireless access points, such as WMAP 431, 433 and 435, provide a communication pathway between a WDAPs 441 and the WDAPp 425. Together, the WMAP's, the WDAPp 425 and the WDAPs 441 provide for communication among a plurality of wireless communication devices, such as MRC's 445 and 447, and the remote stations on the subnets 401 and 403, such as a host computer 407 and personal computers 409, 411 and 413.

Similarly, communication interconnectivity is provided via a second OWL radio network 423. The second network 423 provides for communication flow between the wired subnet 401 and a remote wired subnet 405 via a WDAPp 453, WDAPs 457 and a WMAP 455. Again full communication among a wireless communication device 449, a personal computer 451, the host computer 407 and the personal computer 409 is provided for.

Additionally, communication among remote stations on the remote subnets 403 and 405 and wireless communication devices in either network 421 or 423 is provided. For example, the host computer 407 may communicate to the personal computer 413 via the OWL radio network 421. To do so, the host computer 407 first transmits a message destined for the personal computer 413 onto the wired subnet 401. In response, the WDAPp 425 receives the message, identifies a routing table entry for the personal computer 413, and, in one exemplary spanning tree configuration, routes the message up-stream toward the personal computer 413 via a wireless transmission to the WMAP 431. When the WMAP 431 receives the message from the down-stream WDAPp 425, the WMAP 431 checks with its routing table. Upon finding a routing table entry for the personal computer 413, the WMAP 431 identifies the WMAP 433 as the next relay point in the pathway to the personal computer 413. Thus, via wireless transmission, the WMAP 433 relays the message to the WMAP 433. Upon receiving the message, the WMAP 433 similarly identifies a routing table entry for the personal computer 413, and routes the message to the WMAP 435. In turn, the WMAP 435 routes the message to the WDAPs 441. The WDAPs 441 finally sends the message to the personal computer 413 via the wired subnet 403. Together, the WDAPp 425, WMAP's 431-435 and WDAPs 441 thus provide a communication pathway between the host computer 407 and the personal computer 413.

As noted previously, each WMAP and each WDAP maintains a spanning tree routing table, i.e., a forwarding database, which specifies how local communication traffic should flow therethrough. Upon receipt of a message, the WMAP or WDAP first identifies the destination of the message. The message destination is then compared with the spanning tree routing table. If an entry in the routing table exists for the message destination, corresponding information regarding the next relay point in the pathway to the message destination is retrieved from the routing table. Such information includes the handle of the next relay point and the communication channel required, for example.

As another example, the personal computer 411 may communicate with the personal computer 451 by utilizing both of the OWL radio networks 421 and 423. Specifically, the personal computer 411 transmits a message to the personal computer 451 on the wired subnet 403. In response, the WDAPs 441 receives the message, recognizes that the personal computer 451 is not within its spanning tree routing table, and routes the message downstream to the WMAP 435. The WMAP 435 receives the message from the WDAPs 441, recognizes that the personal computer 451 is not within its routing table, and thus routes the message to its downstream ancestor, i.e., the WMAP 433. Similarly, upon receiving the message, and, because no entry exists in its routing table, the WMAP 433 forwards the message downstream to its spanning tree ancestor, the WMAP 431. Again, finding no routing table entry for the personal computer 451, the WMAP 431 routes the message to the spanning tree root node, i.e., the WDAPp 425. In turn, finding no routing table entry for the personal computer 451, the WDAPp 425, depending on predetermined program control, may: 1) do nothing, aborting the communication attempt; 2) unicast the message on all ports except the one from which the message was received, i.e., floods the ports with the message; 3) unicast the message on selected ports; or 4) consult a routing control field in the message itself to determine which of the above three options to choose.

Assuming program control permits, the WDAPp 425 unicasts the message intended for the personal computer 451 onto the wired subnet 401. Upon receiving the unicast message, the WDAPp 453 locates the personal computer 451 in its routing table, and routes the message upstream to the WMAP 455. The WMAP 455 similarly identifies a personal computer 451 entry, and routes to the next upstream node, i.e., to a WDAPs 457. Finally, the WDAPs 457, identifying a personal computer 451 routing table entry, sends the message via the remote wired subnet 405 to the personal computer 451.

The illustrated communication network similarly supports communication among wireless communication devices, such as MRC's 445, 447 and 449, and remote stations, such as the host computer 407 and the personal computers 409, 411, 413 and 451.

As previously articulated, further detail regarding the present invention can be found with reference to the Appendices A and B. Moreover, additional detail may also be found in the patent applications cited above under the heading "Incorporation By Reference". Such applications are incorporated herein by reference in their entirety.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

APPENDIX A

| Norand OWL Network OWL Network Architecture | Revision 1, January 31, 1994 | page 1 |

OWL Network Architecture

Norand Confidential

| Norand OWL Network | | |
|---|---|---|
| OWL Network Architecture | Revision 1, January 31, 1994 | page 2 |

```
Overview................................................................................................................................3
Network components and definitions.....................................................................................7
MAC-D Sub Layer..................................................................................................................9
    MAC-D Sub Layer for radio links......................................................................................9
        Radio MAC-D Protocol Data Units..............................................................................9
            MAC-D header format..........................................................................................10
            Control frames......................................................................................................10
                Control frame format.....................................................................................10
                Control frame types.......................................................................................10
                    Control request frame types....................................................................10
                    Control response frame types..................................................................10
            Data frames...........................................................................................................11
                Data frame format..........................................................................................11
        Frame transmission........................................................................................................11
        Radio Channel Access...................................................................................................12
    802.3 MAC-D Sub Layer....................................................................................................14
        802.3 MAC-D header format..........................................................................................14
        802.3 MAC-D data frame format....................................................................................15
MAC-R Sub Layer..................................................................................................................15
    MAC-R Protocol Data Units.............................................................................................15
        MAC-R Header Format...................................................................................................15
        MRPDU types................................................................................................................15
    OWL Network Spanning Tree............................................................................................16
        Building the Spanning Tree............................................................................................17
        Attaching through a secondary WDAP...........................................................................19
        MAC-R Routing..............................................................................................................19
            Dynamic routing changes and PDU retransmission............................................21
            Registration...........................................................................................................22
            Broadcast routing..................................................................................................23
    Sleeping Terminal Support................................................................................................23
WDAP bridging......................................................................................................................24
    Optimization considerations..............................................................................................24
MAC-Q Sub layer...................................................................................................................24
MAC-S Sub Layer..................................................................................................................25
```

Norand Confidential

| Norand OWL Network | | |
|---|---|---|
| OWL Network Architecture | Revision 1, January 31, 1994 | page 3 |

Overview.

Norand's open wireless LAN (OWL) architecture is designed to facilitate wireless communications at the MAC sub layer of the ISO protocol stack. An OWL radio network can function as a stand-alone LAN or it can function as a subnet in an 802 LAN to provide wireless access to wired 802 subnets. An 802 LAN may include multiple wired 802 subnets and OWL subnets. Figure 1 shows an example 802 LAN which includes an OWL subnet. The OWL subnet (i.e. subnet 4) includes the OWL radio network (i.e. subnet 2) and an 802.3 subnet (i.e. subnet 3).

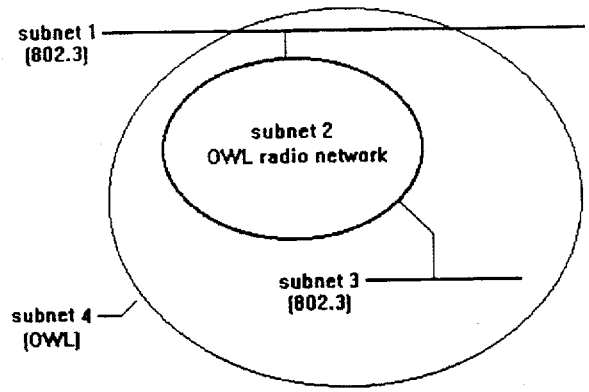

figure 1.

Figure 2 shows an example 802 LAN, similar to the LAN in figure 1, with an expanded view of the OWL radio network. Subnet 1 is not part of the OWL subnet, however it provides a distribution LAN for the OWL subnet. An OWL radio network provides wireless access to the 802 LAN for mobile radio-equipped computers (MRCs). An OWL radio network can also provide a wireless transparent bridge between wired 802 subnets (i.e. an OWL subnet can include a wired 802 subnet). Any node in an 802 LAN, which includes an OWL subnet, can communicate with any other node, at the logical link control (LLC) sub layer of the data link layer. In figure 2, remote station 1 can communicate with either MRC or remote station 9. MRC 6 can communicate with MRC 8 or either remote station.

Norand Confidential

| Norand OWL Network | | |
|---|---|---|
| OWL Network Architecture | Revision 1, January 31, 1994 | page 4 |

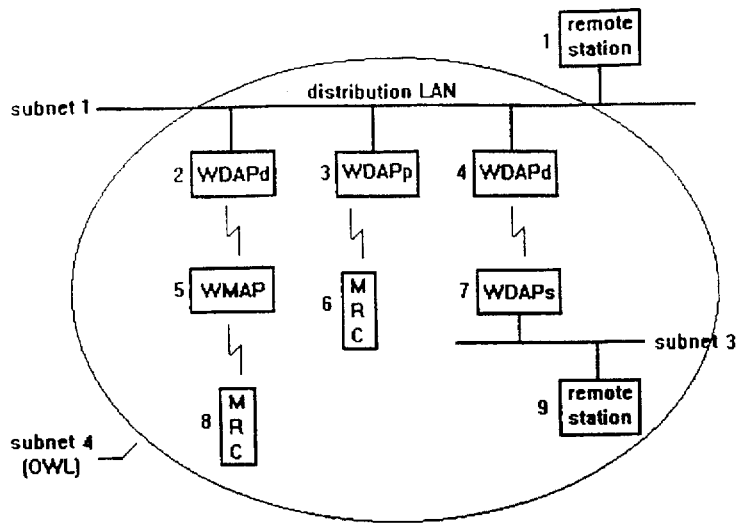

Figure 2.

The IEEE 802.11 committee has defined two basic types of wireless networks - hierarchical and ad hoc. Hierarchical networks contain radio-equipped access points which provide a centralized control function for a given radio coverage area. All communications pass through the access point. The access point also provides access to a wired LAN. A hierarchical network may contain multiple access points which provide an extended seamless radio coverage area. Mobile computers can roam from one access point coverage area to another. Ad hoc networks facilitate peer-to-peer communications in the absence of a central control point. The OWL protocol can support both network types; however this discussion is primarily directed toward hierarchical networks.

The OWL protocol stack is contained in the MAC sub layer of the ISO protocol stack. An OWL MAC (i.e. in a terminal node) provides MAC sub layer services to the LLC sub layer of the ISO data link layer. The OWL MAC is subdivided into 4 sub layers: MAC-D, MAC-R, MAC-Q, and MAC-S.

MAC-D - The MAC-D sub layer is analogous to the data link layer in the ISO protocol stack. The MAC-D layer provides data link services to the MAC-R layer. It is responsible for channel access control and the reliable transmission of MAC-R PDUs across a single link in the OWL network. The MAC-D sub layer is specific to the link type (i.e. radio, ethernet, etc.).

MAC-R - The MAC-R sub layer is analogous to the network layer in the ISO protocol stack. The MAC-R layer provides routing services to the MAC-Q layer. It is responsible for correctly routing MAC-R PDUs through the OWL subnet, which may include multiple hops and circular physical paths.

MAC-Q - The MAC-Q sub layer adds reliability to the radio network by retransmitting lost PDUs. The MAC-Q layer is responsible for discarding out-of-sequence and duplicate PDUs. The MAC-Q sub layer can be implemented as an entity in the MAC-R sub layer. MAC-Q entites exist at entry points to the radio network.

Norand Confidential

| Norand OWL Network | | |
|---|---|---|
| OWL Network Architecture | Revision 1, January 31, 1994 | page 5 |

MAC-S - The MAC-S sub layer is responsible for providing services for security, compression, etc. MAC-S entities exist at entry points to the OWL radio network.

A logical OWL node is a MAC-R addressable entity in an OWL radio network. An OWL node can be one of two types: 1) a terminal node or 2) a relay node. Terminal nodes are end points in the network; relay nodes forward PDUs at the MAC-R sub layer. Figure 3 shows MAC protocol stacks for both node types. The arrows represent the flow of data between MAC sub layers in each node type. (The upper layers in the relay stack are used to process PDUs addressed to the relay node.)

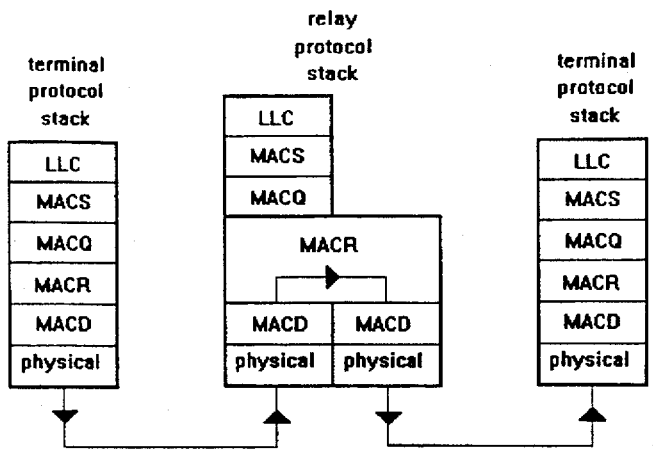

figure 3.

A wireless domain access point (WDAP) is an OWL bridge which is used to bridge a radio subnet to a wired 802 subnet. A WDAP contains a bridge protocol stack. Figure 4 shows the MAC protocol stack for a WDAP. Note that the bridge protocol stack contains a relay protocol stack. The 802.3 MAC-D sub layer is used to send OWL PDUs over an 802.3 link that is part of the OWL radio network. The MAC-Q and MAC-S sub layers serve as proxy MAC-Q and MAC-S entities for stations on the 802.3 sub net. For convenience, the MAC-Q and MAC-S sub layers also service PDUs for the local WDAP 802 address.

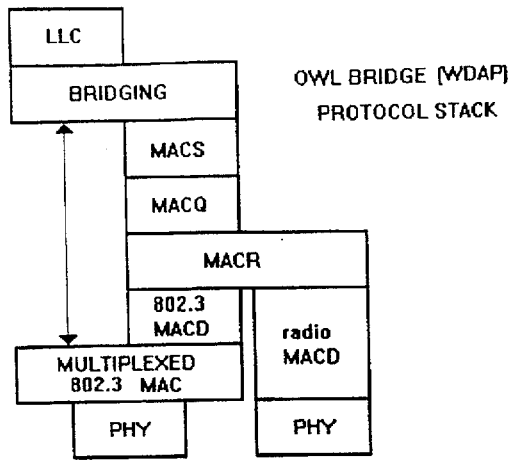

figure 4.

Figure 5 illustrates how data flows through a bridge protocol stack. The dotted line represents the path a PDU takes as it travels from a station on an 802.3 LAN to terminal 2 in an OWL radio network. The WDAP "bridges" the PDU from the 802.3 subnet to the radio subnet. The solid line represents the path a PDU takes as it travels from terminal 1 in the radio network to terminal 2 in the radio network. Since the path is contained in the radio network, the PDU does not have to be bridged.

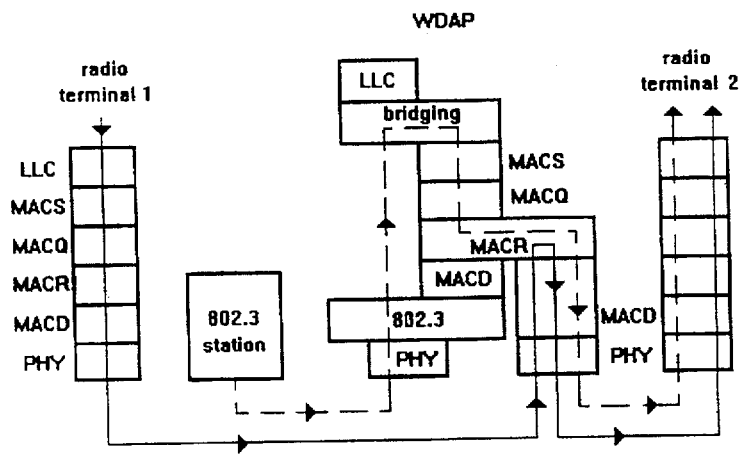

figure 5.

| Norand OWL Network | | |
|---|---|---|
| OWL Network Architecture | Revision 1, January 31, 1994 | page 7 |

In general, PDUs are bridged across subnet boundaries; PDUs are routed within the radio network. A bridging entity in a WDAP uses a forwarding database to determine if a PDU should be bridged from one subnet to another subnet. A forwarding database contains a list of 802 address associated with each subnet to which the WDAP is attached. A MAC-R entity uses a routing table to determine how a PDU should be routed within an OWL subnet.

Network components and definitions.

802 LAN - a local area network which conforms to the IEEE 802 standards. For the purpose of this discussion, it is assumed that "802 LAN" refers to a LAN which contains wired 802.3 subnets and 1 or more OWL subnets.

802 subnet - a subnet in an 802 LAN which is not an OWL subnet.

OWL subnet - a subnet in an 802 LAN which includes an OWL radio network and 0 or more 802 subnets.

OWL Radio Network - An OWL subnet minus its wired subnets (see figure 1). An OWL radio network may include wired (i.e. 802.3) communications links. The OWL radio network consists of MAC-R addressable nodes and communications paths.

Mobile Radio-equipped Computer (MRC) - A mobile radio-equipped computer which contains an OWL terminal node.

Wireless Media Access Point (WMAP) - a radio-equipped base station which allows physical access to a wireless link in an OWL LAN. A WMAP may be connected to the radio network through a wired link or a radio link. A typical OWL radio network has multiple WMAPs with overlapping coverage areas. MRCs can roam between coverage areas. Except for possible timing issues, roaming has no effect on protocol layers above the MAC sub layer.

Wireless Domain Access Point (WDAP) - a logical access point to an OWL radio network. There are several types of WDAPs which are defined below. A WDAP is typically contained in a WMAP which is directly connected to a wired 802 subnet. The WDAP provides a bridge between the radio network and the wired subnet. A WDAP has a MAC-S and MAC-Q sub layer since it provides an entry point to the radio network. At any given time, one, and only one, WDAP provides access to a distribution LAN for a node in the OWL subnet.

OWL Node - A MAC-R addressable entity in an OWL radio network.

OWL Terminal Node - A MAC-R addressable OWL node which is an end point in an OWL radio network. A terminal OWL node is simply referred to as a terminal when the meaning is not ambiguous. A terminal has a MAC-S and MAC-Q sub layer since it provides an entry point to the radio network.

OWL Relay Node - A MAC-R addressable OWL node which is an interior node in an OWL radio network. MAC-R frames are routed through OWL relay nodes.

OWL Spanning Tree - An OWL spanning tree consists of a single root node, OWL relay nodes, terminal nodes, and edges, where a single edge logically connects two nodes for routing purposes. A branch is a logical path which contains 1 or more edges and the associated nodes. <u>MAC-R frames are routed along branches of a spanning tree</u>.

OWL Network Spanning Tree - All nodes in a hierarchical OWL subnet are organized into a network spanning tree for control purposes. A single network spanning tree constitutes an OWL domain. The root

| Norand OWL Network | | |
|---|---|---|
| OWL Network Architecture | Revision 1, January 31, 1994 | page 8 | of the network spanning tree contains a primary WDAP. Note that an 802 LAN may contain multiple OWL network spanning trees (domains).

OWL Access Spanning Tree - An access spanning tree is a sub tree in a network spanning tree. The root of an access spanning contains a distributed or primary WDAP and provides direct access to a distribution LAN.

Net ID - The Net ID identifies the set of nodes which belong to a single OWL domain - a network spanning tree or an instance of an ad hoc network. A hierarchical bit specifies whether the Net ID is for a hierarchical network or an ad hoc network. A global bit is used to indicate if the Net ID is globally unique. All nodes in an OWL domain share a common Net ID.

Super Root - the root of a network spanning tree. Multiple access points, attached to a distribution LAN, can negotiate to determine which node should function as the super root of a network. The super root is the node with the highest super root priority. The super root must have direct access to a distribution LAN. The super root is the primary WDAP.

Access Root - the root of an access spanning tree. An access root is a primary or distributed WDAP.

Distribution LAN - An 802 LAN segment which connects a wired subnet to the OWL subnet through the primary WDAP and 0 or more distributed WDAPs.

Distributed Root - the set of nodes which consists of the super root and all access roots. For a single OWL node, the distributed root can be viewed as the super root and the distributed WDAP which is providing access for the node to the distribution LAN.

Primary WDAP (WDAPp) - A single primary WDAP serves as the super root and provides a single control point for an OWL subnet. The primary WDAP has direct access to the distribution LAN. The primary WDAP forwards 802 frames from the distribution LAN to the OWL subnet and from the OWL subnet to the distribution LAN.

Distributed WDAP (WDAPd) - A distributed WDAP provides direct physical access to the distribution LAN. Distributed WDAPs exist within the domain of the primary WDAP. A distributed WDAP forwards 802 frames from the distribution LAN to the OWL subnet and from the OWL subnet to the distribution LAN.

Secondary WDAP (WDAPs) - An OWL subnet may include remote wired subnets other than the distribution LAN. A single secondary WDAP serves as a bridge between the remote wired subnet and the OWL subnet. 802 frames are forwarded from the remote wired subnet to the radio subnet and from the radio subnet to the remote wired subnet through the secondary WDAP.

Station - an entity in the 802 LAN which has a unicast 802 address.

OWL Station - a station in an OWL radio network.

Remote Station - a station which is not in an OWL radio network.

Node ID - In a hierarchical network, each OWL node must obtain a network unique node ID from the super root. The concatenated Net ID and node ID uniquely identify the node within the radio network. The node ID for a relay node includes a port ID field which is used to uniquely define each port within a node (i.e. in case a node has more than one port per physical link). Port IDs are defined internally by each node. A port ID of all 1's is reserved as a broadcast port ID.

Norand Confidential

| Norand OWL Network | | |
|---|---|---|
| OWL Network Architecture | Revision 1, January 31, 1994 | page 9 |

In an ad hoc network, node IDs are randomly generated from the set of node IDs which are not known to be in use. Node ID 1 is reserved for the node which initiated the ad hoc network.

originator - the node which originates a unicast or multicast transmission.

sink - the target node of a unicast transmission.

conversation - a series of transmissions which are used to forward a frame from an originator to a sink. The frame may be divided into multiple fragments.

MDPDU - a MAC-D sub layer protocol data unit.

MRPDU - a MAC-R sub layer protocol data unit.

MQPDU - a MAC-Q sub layer protocol data unit.

MSPDU - a MAC-S sub layer protocol data unit.

MQPDUID - The concatenation of the MQPDUID and 802 source and destination addresses uniquely identifies an MQPDU in an OWL radio network.

inbound - Nodes which are logically closer to the root node of a spanning tree are considered "inbound" from nodes which are further from the root. A DOWNSTREAM bit in a MAC-R control field is set ON to indicate that the source of a MRPDU is inbound from the destination of the PDU. Note that terminal nodes never set the DOWNSTREAM bit ON. A inbound PDU is any PDU which is traveling toward the root.

outbound - Nodes which are logically further from the root node of a spanning tree are considered "outbound" from nodes which are closer to the root. An outbound PDU is any PDU which is traveling away from the root.

MAC-D Sub Layer.

The MAC-D sub layer controls access to the channel and is responsible for providing reliable transmission between any two devices in the radio network. A radio network may include both wired and radio links. The MAC-D sub layer is specific to the physical link type. An 802.3 MAC-D sub layer is used on 802.3 links and a radio MAC-D sub layer is used on radio links.

MAC-D Sub Layer for radio links.

The radio MAC-D sub layer provides "acknowledged connectionless" services to the MAC-R sub layer. A "connection" is not required to transmit an MRPDU; however, each PDU is acknowledged at the MAC-D sub layer and errors are reported to the MAC-R sub layer. For a terminal node, a MAC-D link error provides an indication that the terminal has roamed.

Radio MAC-D Protocol Data Units.

An MDPDU is classified as either a control frame or a data frame. Control frames facilitate network access and error recovery for unicast conversations. Data frames contain an MRPDU. A single bit in a frame type field indicates whether a frame is a control frame or data frame. A common header format is used for both control and data frames.

Norand Confidential

| Norand OWL Network | | |
|---|---|---|
| OWL Network Architecture | Revision 1, January 31, 1994 | page 10 |

MAC-D header format.

protocol ID
network ID
destination node ID
source node ID
control
reservation

Control frames.

Control frame format.

preamble
SFD (start frame delimiter)
<physical layer header>
MAC-D header
CRC

Note that control frames have a fixed length.

Control frame types.

A control frame is classified as either a request frame or a response frame. A single bit in the type field indicates if a control frame is a request or a response.

*Control request frame types.*

RFP - an RFP frame is used to reserve the network for a unicast conversation.

ENQ - an ENQ frame is used by an originator to determine the status of a previous end-of-data fragment transmission. The sink responds by re-transmitting its last CLEAR. If the sink node does not have CLEAR state information, it responds to an ENQ by transmitting a REJECT. Note that an ENQ/POLL pair correspond to an RFP/POLL pair with respect to channel access.

ABORT - an ABORT can be used by an originator to abort an active conversation. Note that a conversation can be restarted at any time.

*Control response frame types.*

POLL - a POLL is used to grant access to the network and to solicit the transmission of a unicast data frame fragment. The control byte in an POLL frame contains the 1-bit sequence number of the next data frame fragment expected.

CLEAR - a CLEAR frame is used to acknowledge the reception of the last unicast data frame fragment in a conversation. A last-in-chain (LIC) bit distinguishes a CLEAR frame from an POLL frame.

REJECT - a REJECT frame is used by a sink to notify an originator that a unicast conversation has been aborted by the sink or that the sink does not have POLL state information for the originator. The originator must restart the conversation. If a sink receives an out-of-sequence DATA frame, it replies with a REJECT frame and aborts the conversation.

FRMR - a FRMR frame can be transmitted by a sink to indicate that an unrecognized frame type was received.

Norand Confidential

| Norand OWL Network | | |
|---|---|---|
| OWL Network Architecture | Revision 1, January 31, 1994 | page 11 |

Data frames.

Data frames are used to send MAC-R data. The control field in a data frame contains a 1-bit sequence number used to facilitate fragmentation and re-assembly of large unicast frames. All broadcast and multicast transmissions consist of a single DATA frame. Unicast frames may be broken into multiple DATA fragments for transmission. A first-in-chain (FIC) bit is set ON in the first DATA fragment of a frame. The sink resets its receive sequence state when an FIC DATA fragment is received. A last-in-chain (LIC) bit is set ON in the last DATA fragment of a frame. Note that both FIC and LIC are set ON in single-fragment frames. An EOD (end-of-data) fragment is a data fragment with the LIC bit set ON. Fragmentation and re-assembly at the MAC-D sub layer is transparent to the MAC-R sub layer.

Data frame format.

preamble
SFD
MAC-D header
MRPDU fragment
CRC

Frame transmission.

A MULTI bit in the control byte is used to indicate if a response is required for a DATA request frame. The MULTI bit must be set ON for all frames which contain a broadcast or multicast source or destination ID. The MULTI bit can be set ON for unicast transmissions if an acknowledgment is not required.

Example multicast transmission:

```
EOD ---------------------->
```

Example unicast transmission with no errors:

```
RFP ---------------------->
    <---------------------- POLL 0
DATA 0 ------------------->
    <---------------------- POLL 1
DATA 1 ------------------->
    <---------------------- POLL 0
EOD 0 -------------------->
    <---------------------- CLEAR 1
```

If a sink receives an RFP frame and the channel is reserved, then the sink must withhold the POLL frame. The originator must calculate a random back off time and retry later.

Norand Confidential

| Norand OWL Network | | |
|---|---|---|
| OWL Network Architecture | Revision 1, January 31, 1994 | page 12 |

Example transmission with errors:

```
RFP ------------------------>
      <------------------------ POLL 0
DATA 0 --------------------->
      <------------------------ POLL 1
      { POLL lost}
      <------------------------ POLL 1
DATA 1 --------------------->
      { DATA lost }
      <------------------------ POLL 1
DATA 1 --------------------->
      <------------------------ POLL 0
EOD 0 ----------------------->
      <------------------------ CLEAR 1
      { CLEAR lost }
ENQ ------------------------->
      <------------------------ CLEAR 1
```

Radio Channel Access.

Channel access in an OWL radio network is complicated by the presence of multiple overlapping radio coverage areas and hidden nodes. A given first radio transceiver is said to be hidden from a second transceiver, if the second transceiver is not in range of the first, but transceivers exist which are in range of both. In figure 6, the large circles represent the radio coverage area of nodes A, B, C, and D. C, for example, is considered to be hidden from A since it is not in A's coverage area, but a node, B, is in the coverage area of both.

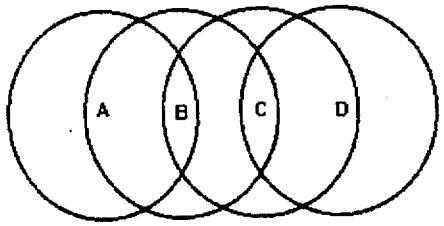

figure 6.

The hidden node problem can severely limit bandwidth utilization in a simple carrier sense radio network if the percentage of hidden nodes is significant. As an example, assume that node A, in figure 6, is transmitting a frame to node B. If, at the same time, C senses the channel it will appear idle, since C can not hear A. If C begins transmitting to D, the transmission from A will collide with the transmission from C at B and will likely be lost. (The transmissions from A and C will not collide at D.)

The OWL MAC-D sub layer uses a listen-before-talk (LBT) collision avoidance protocol to reduce the number of collisions caused by hidden nodes. Nodes reserve the channel for unicast conversations. The reservation in request frames reserves the channel for succeeding data frames. Response frames echo the

| Norand OWL Network | | |
|---|---|---|
| OWL Network Architecture | Revision 1, January 31, 1994 | page 13 | reservation in the previous corresponding request frame. The reservation in a request frame does not have to span an entire conversation since the reservation can be extended in succeeding data frames. (Shorter reservations reduce dead times when frames are lost.) The reservation in a request frames includes an implicit reservation for the required response (including turnaround time).

The channel reservation technique generally restricts channel access contention to RFP frames. In the absence of lost frames, an LBT algorithm is executed only once per MAC-D conversation. An originator executes the LBT algorithm and transmits an RFP frame if the channel is free. The originator owns the channel for the duration of a conversation as soon as it receives a POLL from the sink. Subsequent DATA fragments can be sent without additional channel access logic. If the channel is not free, a random back off algorithm, chooses a back off delay as a function of the LBT slot time and the number of retries. An LBT slot is defined as a function of the best case and worst case busy-sense time. The best case busy sense time is equal to the amount of time from the point at which a node detected the channel idle, before transmitting, until another node can detect the transmission in progress. The worst case busy-sense time is equal to the time required by the originator to sense the channel idle and send an RFP frame plus the time required by a sink to start sending a POLL frame. Figure 7 shows a time line for a unicast conversation between two nodes, A and B. If the originator, A, senses the channel idle at time 0, then the worst-case busy sense time is $t_{ws}$.

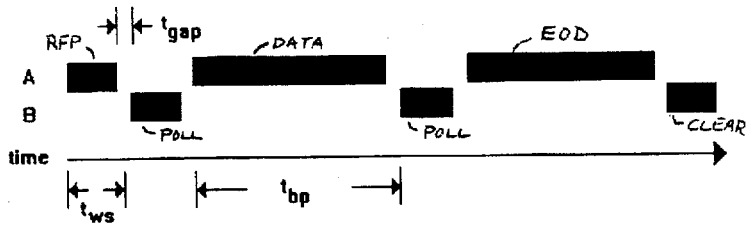

figure 7.

Each node in the network must maintain RESERVE_TIME and RESERVE_NODE channel reservation variables and a local clock. The channel is reserved if the RESERVE_TIME value is greater than the current time. The RESERVE_TIME variable is updated if a reservation is received and 1) the channel is currently not reserved, or 2) the transmitter of a request frame is the RESERVE_NODE node, or 3) the destination of a response frame is the RESERVE_NODE node, or 4) the reservation field in a unicast frame reserves the channel for a time greater than the current RESERVE_TIME period. The RESERVE_TIME is set to 0 whenever a reservation of 0 is observed and the RESERVE_NODE node is the destination of a response frame. The RESERVE_TIME is set to 0 whenever the local node is the target of a unicast transmission from the RESERVE_NODE.

The RESERVE_NODE is set to the concatenated Net ID and node ID of the node which is reserving the channel (i.e. the source node ID and Net ID in a request frame or the destination node ID and Net ID in a response frame) whenever the RESERVE_TIME is updated.

The channel is considered busy if it is sensed busy or if it is reserved. If the channel is reserved the random delay, chosen by the random back off algorithm, is added to the reserve time. When the delay time expires, the originator repeats the LBT algorithm.

Norand Confidential

| Norand OWL Network | | |
|---|---|---|
| OWL Network Architecture | Revision 1, January 31, 1994 | page 14 |

A basic service set (BSS) includes a WMAP and its children. In a frequency hopping network, each BSS is, for the most part, isolated from its neighbors by channel frequency separation, but BSS frequencies may occasionally overlap. Reservations may be missed if BSS frequencies overlap for part of a conversation. If a frequency hop time begins with a synchronization frame, then the synchronization frame can include an indication that the channel is busy.

A sleeping node is any node which has not been actively listening to network traffic. A sleeping node may miss an RFP POLL sequence. The OWL radio MAC-D protocol uses a busy-pulse technique to support sleeping terminals. POLL frames provide periodic pulses to indicate that the source node is busy. A sleeping terminal is required to monitor the channel for a busy-pulse period before accessing the channel. If a conversation is in progress, the terminal is guaranteed to hear either the originator or the sink within the busy-pulse period. In figure 7, the busy-pulse period is $t_{bp}$. The busy-pulse period is well-defined if the maximum fragment and turn-around times are fixed. The combined OWL reservation and busy-pulse protocols provide a channel access solution which is analogous to a busy-tone channel access protocol.

Terminal nodes should limit the total retry time at the MAC-D sub layer, so that roaming can be quickly detected, and a new path in the spanning tree quickly re-established. Relay nodes should lower the number of retries, due to lost frames, when the sink is a terminal node, since the lost frames may be due to roaming. The retry limit should be much higher when both the originator and sink are relay nodes.

802.3 MAC-D Sub Layer.

The 802.3 MAC-D sub layer is used to forward MAC-R PDUs across 802.3 links. All 802.3 MAC-D frames use a common reserved 802 multicast address and LLC SNAP access point identifier in the 802.3 and LLC header, respectively. The OWL MAC-D PDU is contained within the LLC PDU. The 802.3 MAC-D sub layer is used when two (or more) nodes in the OWL network spanning tree are physically connected by an 802.3 link. Note that the same physical link can function both as a distribution LAN and as the physical link associated with a path in the network spanning tree. It is important to understand the following distinction. If a WDAP bridges a frame onto a distribution LAN, then the frame is no longer on a branch in the OWL network spanning tree, even if the destination 802 address belongs to a node in the OWL subnet; however, if a WMAP routes an MRPDU to another WMAP then the PDU is forwarded on a branch in the spanning tree, even if the physical link used to forward the PDU also serves as the distribution LAN.

The 802.3 MAC-D PDU fields are shown below. All 802.3 MAC-D transmissions consist of a single data PDU. No control frames are defined. An 802.3 MAC-D sub layer does not fragment MAC-R PDUs.

802.3 MAC-D header format.

protocol ID
network ID
destination node ID
source node ID
control
reservation

Norand Confidential

802.3 MAC-D data frame format.

802.3 header
LLC header with SNAP access points
MAC-D header
MRPDU
CRC

MAC-R Sub Layer.

The MAC-R sub layer is responsible for correctly routing higher layer PDUs through the OWL subnet. OWL nodes are organized into a network spanning tree and PDUs are routed along branches of the spanning tree. The MAC-R sub layer also provides support for sleeping terminals and distributes network node IDs. The MAC-R sub layer provides unacknowledged connectionless services.

MAC-R Protocol Data Units

MAC-R Header Format length
type
control
destination 802 address
source 802 address
<type specific fields and optional parameters>

MRPDU types.

REGISTRATION - A node sends a REGISTRATION request to the super root to obtain an OWL network node ID. The registration PDU contains the 802 address of the node. The super root records the 802 address and returns a node ID in a REGISTRATION response PDU. A REGISTRATION request may contain a node alias. The alias is the permanent name of a node in the OWL radio network. A REGISTRATION request may also contain a globally unique network access code. The access code can be used to restrict network access to those nodes which, for example, belong to a single organization.

ATTACH - A node sends an ATTACH request to a parent node to attach to the OWL subnet. The ATTACH request is forwarded to the distributed root to establish full connectivity in the OWL subnet. The distributed root returns an ATTACH response packet to acknowledge the ATTACH request. An attach indication (ATTI) bit in the control field of the ATTACH request indicates if the path to the node which generated the ATTACH request has changed. The MAC-R entity in an access root sets a DISTRIBUTED bit ON in the control field of an ATTACH request before forwarding the request to the super root. The super root records the DISTRIBUTED bit in its routing table and does not forward frames from the distribution LAN to the attaching node if the DISTRIBUTED bit is ON.

HELLO - Each relay node in a hierarchical OWL radio network periodically broadcasts HELLO response PDUs to advertise its presence. Pending messages for sleeping terminals and broadcast messages can be associated with HELLO PDUs. A node can send a HELLO request PDU to solicit (unscheduled) HELLO response PDUs from attached relay nodes. Each HELLO response PDU contains the 802 address of the super root and a super root sequence number. The super root address and sequence number are used to uniquely identify an occurrence of an OWL network. In addition, each node in the network can learn the 802 address of the super root.

DATA - DATA request MRPDUs are used to transport higher layer data.

| Norand OWL Network | | |
|---|---|---|
| OWL Network Architecture | Revision 1, January 31, 1994 | page 16 |

R-DATA - DATA response MRPDUs are used to reroute undelivered DATA request MRPDUs after a route has changed.

ALERT - A relay node sends an inbound ALERT request when it is unable to deliver a PDU to a child. The ALERT request is used to determine if the path to the child is still valid and is optionally used to alert the child that it has missed a PDU and should re-attach.

DETACH - A relay node sends a DETACH response node to delete a path to an outbound node.

OWL Network Spanning Tree.

Nodes in an OWL radio network are organized into a network spanning tree. A primary WDAP serves as the (super) root of the spanning tree. PDUs are routed along branches of the spanning tree. Figure 8 shows physical devices and links in an example OWL network. Figure 9 shows the same network organized as a logical network spanning tree.

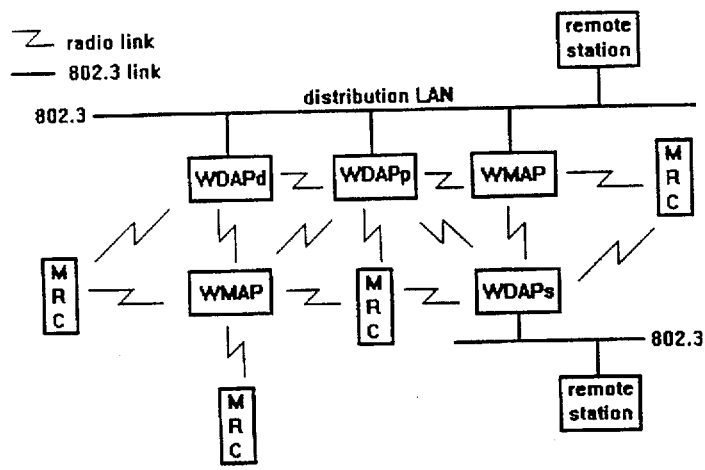

figure 8.

Norand Confidential

| Norand OWL Network | | |
|---|---|---|
| OWL Network Architecture | Revision 1, January 31, 1994 | page 17 |

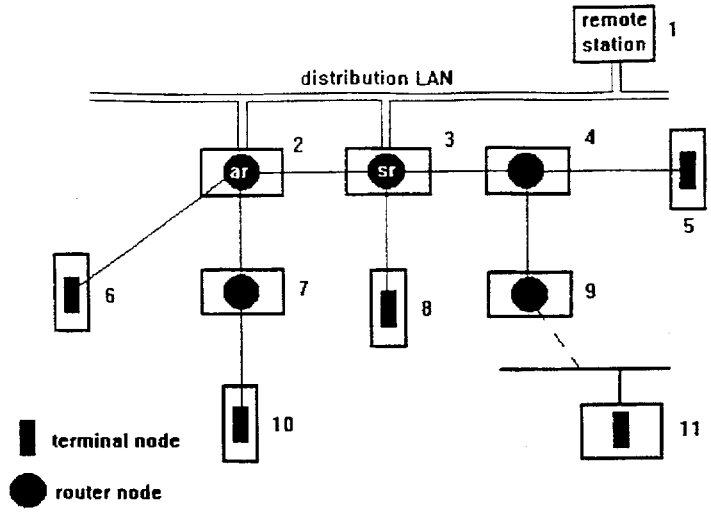

figure 9.

The spanning tree eliminates loops in the physical topology. The node labeled "sr", in figure 9, is the super root and the node labeled "ar" is an access root. The parallel lines represent the distribution LAN, which is not part of the spanning tree. The super root and access root both have access to the distribution LAN; the WMAP labeled 4 can not directly access the distribution LAN. WMAP 4 forwards PDUs destined for the distribution LAN through the super root (i.e. with an 802.3 MAC-D sub layer). The remote station, labeled 1, on the distribution LAN is not part of the network spanning tree; however, the secondary 802 LAN and the remote station, labeled 11, can be viewed as part of the spanning tree (as indicated by the dotted edge).

Building the Spanning Tree.

Nodes in the radio network are generally categorized as attached or unattached (i.e. to the network spanning tree). Initially, only the super root is attached. A single WDAP can be designated to contain the root node, or multiple root candidates can negotiate to determine which node assumes the super root status. The root and other attached relay nodes broadcast HELLO response PDUs at calculated intervals. The HELLO response PDUs enable unattached nodes to learn the optimum path to the super root before attaching to the network. The HELLO response PDUs include: 1) the source node ID and 802 address; 2) a broadcast destination node ID and 802 address; 3) the "cost" to the super root; 4) a "seed" value used to calculate the time of the next HELLO response PDU; 5) a hello displacement time; 6) the priority of the super root node (or root candidate); 7) the 802 address of the super root (or root candidate); and 8) a super root sequence number, used to distinguish between multiple occurrences of the network spanning tree with the same super root.

The HELLO "cost" field indicates the total "distance" to the super root, and is equal to the sum of the costs of each hop on the path to the root. (Note that the super root broadcasts HELLO PDUs with the cost field set to zero.) The incremental cost of the hop between a node and its parent is primarily a function of the physical link type (i.e. ethernet or radio). The cost component is intended to bias path selection toward high-speed (i.e. wired) connections. On radio links, spanning tree attachment is biased toward the link with

| Norand OWL Network | | |
|---|---|---|
| OWL Network Architecture | Revision 1, January 31, 1994 | page 18 | the best signal strength. Signal strength is not a factor in the cumulative path cost. The HELLO "displacement" field specifies the displacement of the actual hello time from the calculated hello time or indicates that the hello time was unscheduled. A well-known randomization algorithm is used to calculate the next hello time. The HELLO "seed" field is used as a seed for the calculation. The "root 802 address" and "root sequence" fields are used to define a single instance of the radio network. Attached nodes must forget their node ID and return to the unattached state whenever a HELLO response PDU is received with a new root 802 address or root sequence number. HELLO response packets can contain other optional parameters (such as a distributed clock or a pending message list).

Nodes without a parent in the spanning tree are in an unattached state. In the unattached state, a node learns which attached relay node is closest to the super root by listening to HELLO response PDUs. (If no HELLO response PDUs are received, the node can wait (i.e. sleep) and retry later.) After the learning period expires an unattached node sends an ATTACH request packet to the attached relay node with the lowest cost to the super root. The ATTACH request contains an ATTACH ID, which is a sequence number that is incremented whenever an ATTACH request is generated. (Nodes without a node ID must first send a REGISTRATION request packet to the root to obtain an OWL node ID.) The attached relay node forwards the ATTACH request packet to the super root. The end-to-end ATTACH request functions as a discovery packet and enables relay nodes along the path to the super root to quickly learn the path to the source node. The super root returns the request as an end-to-end ATTACH response PDU. The node which originates an ATTACH request is responsible for retrying the request until a matching response is received, to insure that it is fully attached. When the unattached node receives the ATTACH response PDU it goes to an attached state and sets internal root port and parent variables. The root port is the physical port on which the response PDU arrived and the parent variable contains the node ID and 802 address of the parent node. A child node will only accept outbound unicast MRPDUs from its parent. If the newly attached node is a relay node, it calculates its cost to the super root, by adding its root port link cost to the HELLO cost of its new parent, and begins to broadcast HELLO response PDUs.

ATTACH requests are always forwarded to the super root. Inbound ATTACH requests establish a new path from the super root to the source node. If an ATTACH request arrives at the super root, and a distributed WDAP exists which is on the old path to the source node, but is not on the new path, then the super root must forward the ATTACH request as an outbound PDU to the distributed WDAP. When the distributed WDAP receives the ATTACH request, it will read filter and forward sequence numbers from the request and will enter its filter and forward sequence numbers for the source node into the request. The ATTACH request is returned to the super root as an inbound ATTACH response. The distributed WDAP will delete its routing table entry for the node which originated the ATTACH request. A forward sequence number of zero in an ATTACH request is used to reset the filter sequence number in a WDAP. A forward sequence number of zero in an ATTACH response is used to reset the filter sequence number in a terminal.

An attach indication (ATTI) bit is set ON in an ATTACH request PDU whenever the path to the source of the ATTACH request changes to notify the distributed root that the source node has just attached to the network. If a distributed WDAP receives an ATTACH request and the ATTI bit is ON then it will retransmit any undelivered PDUs as R-DATA PDUs with a RETRY bit set ON. An undelivered PDU is any DATA PDU which has a sequence number which is newer than the filter sequence number in the ATTACH request.

Unattached terminal nodes can optionally broadcast a global HELLO request PDU with a multicast relay node ID and broadcast 802 destination address to solicit unscheduled HELLO response PDUs from attached relay nodes. The net effect is that the unattached state can (optionally) be shortened. (Note that only attached relay nodes respond to request PDUs.) The HELLO request facility is intended for unattached terminals with transactions in progress.

Each attached node must transmit an ATTACH request PDU at least once per ATTACH_TIMEOUT time period to maintain its path in the radio network. An attached node must also transmit an ATTACH request PDU to its parent whenever it misses MAX_HELLO_LOST consecutive scheduled HELLO response PDUs from its parent and whenever it receives an alert. An alert can occur in an alert PDU or in an optional alert

| Norand OWL Network | | |
|---|---|---|
| OWL Network Architecture | Revision 1, January 31, 1994 | page 19 | list in a HELLO response PDU. If a relay node is unable to deliver a PDU to a child node, then the relay node adds the node ID of a child node to its alert node list and, optionally, generates an alert PDU which is sent down all branches of the spanning tree.

Each node (except the super root) should maintain an in-range list which contains the node ID and 802 address of potential alternate parent nodes. If a child loses its parent (i.e. due to a MAC-D link error) or detects a better path, then the child can change its path in the spanning tree by selecting the best candidate from the in-range list and attaching to the new parent. Relay nodes must avoid sporadic path changes. If a child loses its parent and the in-range list is empty, it must remain in a quiet learning state until a potential parent is discovered.

Attaching through a secondary WDAP.

A remote wired 802 subnet is attached to an OWL subnet through a secondary WDAP. A secondary WDAP is responsible for attaching its wired subnet(s) to the radio network. The secondary WDAP must generate ATTACH request PDUs for each remote station on its wired subnets so that MAC-R entities on the path to the WDAP can learn the route to those remote stations. A secondary WDAP negotiation protocol is used to select a single designated secondary WDAP, if more than one secondary WDAP is connected to a remote wired segment. The designated WDAP is solely responsible for bridging between its wired subnet and the radio network. Any other secondary WDAP on the same segment would function as any other remote station on the segment.

MAC-R Routing.

All PDUs are routed along branches of the spanning tree. Relay nodes "learn" the path to outbound nodes by monitoring inbound traffic (i.e. traffic directed toward the root). Whenever a relay node receives an inbound REGISTRATION, ATTACH, or DATA request PDU from an outbound node, it creates or updates an entry for the source node in its routing table. The entry includes the source node's 802 address and the node ID of the node which sent the PDU (i.e. the hop source ID). When a relay node receives a PDU from an inbound node the PDU is forwarded to the outbound hop which is specified in the routing entry for the 802 destination. The PDU is discarded if a routing entry does not exist.

As an example, the routing table for relay node 4, in figure 9, is shown in figure 10 below. The destination field contains the 802 address of a node in the sub tree rooted at 4. The first hop field contains the node ID of the first hop on the path to the destination. (The node labels from figure 9 are used in lieu of 802 addresses and node IDs, in this example.) The child field indicates if the destination is a child. The attach ID field is used to associate ATTACH and DETACH requests and responses. The port field specifies the physical port used to communicate with the first hop. The type field can be RELAY or TERMINAL. The status field is used to mark each entry as ATTACHED or UNATTACHED. The super root must also mark each entry which specifies a path through a distributed WDAP as DISTRIBUTED. The age field indicates the last time the destination was active and is used to "age" away old table entries. Assume that relay 4 has received an ATTACH request from node 11 through relay 9. Relay 4 adds an entry for destination 11 with the first hop set to 9, the age set to 0, and the status set to ATTACHED.

| Destination | Type | Child | First Hop | Attach Time | Attach ID | Port | Status | Age |
|---|---|---|---|---|---|---|---|---|
| 11 | TERMINAL | No | 9 | 1223 | 4 | 1 | ATTACHED | 0 |
| 5 | TERMINAL | Yes | 5 | 802 | 2 | 1 | ATTACHED | 2 |
| 9 | RELAY | Yes | 9 | 907 | 5 | 1 | ATTACHED | 1 | figure 10.

| Norand OWL Network | | |
|---|---|---|
| OWL Network Architecture | Revision 1, January 31, 1994 | page 20 |

PDU's from outbound nodes are simply forwarded to the next inbound node (i.e. the parent) in the branch of the spanning tree. No explicit routing is required for inbound traffic because the route is defined by the structure of the spanning tree. A PDU travels inbound until a node is reached which has an entry in its routing table for the destination 802 address. The PDU is then explicitly routed outbound until it reaches its destination. Thus, communications between any two nodes is accomplished by routing all traffic through the nearest common ancestor of both the source and destination node. If a PDU reaches a primary or distributed WDAP and an entry for the 802 destination does not exist in the routing table of the WDAP, then the PDU can not be routed outbound (i.e. a common ancestor does not exist). In this case, the WDAP can "bridge" the PDU, as an 802 frame, onto the distribution LAN. Note that a PDU which is bridged onto the distribution LAN by a distributed WDAP, will be bridged back into the OWL subnet (i.e. by a second WDAP) if the 802 destination is in the OWL subnet.

As an example, in figure 9, if a PDU is sent from terminal 10 to terminal 5 it will be routed as follows: Terminal 10 will send the PDU to its parent, WMAP 7. Since WMAP 7 does not have an entry in its routing table for terminal 5, it will forward the PDU inbound to its parent, WDAP 2. The MAC-R entity in WDAP 2 does not have an entry in its routing table, so it will forward the PDU to its bridging entity and the PDU will be bridged onto the distribution LAN as an 802 frame. The bridging entity in WDAP 3, the super root, , will forward the frame to its MAC-R entity because it has an entry in its forwarding data base, which specifies the radio network as the subnet for terminal 5. The MAC-R entity in WDAP 3 has an entry in its routing table for terminal 5 and will forward the PDU to the first outbound hop, WDAP 4, over the wired link (i.e. with an 802.3 MAC-D sub layer). WDAP 4 will then deliver the PDU to terminal 5.

As a second example, if remote station 11, in figure 9, sends a PDU to remote station 1 it will be routed as follows: The bridging entity in the secondary WDAP, 9, will determine that station 1 is not on its local 802.3 subnet (i.e. by querying its forwarding database) and will bridge the PDU into the radio network (i.e. by passing the frame to its MAC-R entity). The MAC-R entity in WDAP 9 will forward the PDU inbound to WMAP 4, since it does not have an entry for station 1 in its routing table. WMAP 4 will forward the PDU to WDAP 3. The MAC-R entity, in WDAP 3, does not have an entry for station 1 and will pass the PDU to its bridging entity. The bridging entity will forward the PDU onto the distribution LAN as an 802 frame addressed to station 1.

Dynamic routing changes and PDU retransmission.

Paths in the spanning tree change often as terminals roam. PDU transmission errors due to roaming fit into one of two possible cases: 1) a terminal node is unable to deliver a PDU to its parent, or 2) a relay node is unable to deliver a PDU to a child terminal.

In the first case, the terminal can simply select a new parent and re-attach to the network by sending an ATTACH request. An attach indication is generated whenever the path to a terminal node changes. The MAC-R entity in a relay node updates its routing table entry for an outbound source node if an inbound ATTACH (or REGISTRATION) request PDU is received from the node and the hop source is not the same as the first hop in the table entry for the node. The first hop field, in the routing table entry, is overlaid by the hop source of the PDU and outbound PDUs are now routed along the new path. (Note that an old disconnected path fragment may still exist in the spanning tree after a new path has been established.) ATTACH requests are always forwarded to the super root and are forwarded to the WDAP which provided the single entry point to the distribution LAN for the terminal, if the ATTI bit is ON. If an ATTI ATTACH request is received from a terminal by a WDAP which owns the distribution LAN entry point for the source, then the WDAP will delete any old routing table entry for the source node and will post its MAC-Q entity with an attach indication.

A relay node may not be able to deliver a DATA PDU to a child, for several reasons: 1) the child may be asleep; 2) the channel may be reserved in the child's coverage area; 3) the PDU may be lost due to excessive errors; or 4) the child may have selected a new parent (i.e. due to roaming). It is assumed that most undelivered PDUs are lost because child nodes roam. If a parent relay node can not deliver a PDU to a Norand Confidential

| Norand OWL Network | | |
|---|---|---|
| OWL Network Architecture | Revision 1, January 31, 1994 | page 21 | child node, then (if the routing table entry for the child has not been updated) the parent node will 1) mark the routing table entry for the child as UNATTACHED, 2) add an alert record for the child node to its internal alert list, and 3) send an ALERT request to the super root. The ALERT PDU contains the ATTACH ID from the routing table entry for the child node. When a relay node, on the path to the super root, receives an inbound ALERT request it determines a) if the alert ATTACH ID matches the ATTACH ID in its routing table and b) if the hop source in the ALERT request is the same as the first hop field in the routing table entry for the alert destination. If both conditions are satisfied then the relay node will 1) mark its routing table entry for the lost child as UNATTACHED, 2) optionally add the associated alert record to its internal alert list, 3) forward the ALERT request to the next hop on the path to the super root, and 4) optionally forward the ALERT request down each of its outbound branches, other than the one on which it arrived. If either condition is not satisfied then the relay node will, instead, send an outbound DETACH response on the UNATTACHED path on which the ALERT request arrived. The DETACH ID in the DETACH response is the same as the ID in the ALERT request and the destination is the 802 address of the lost child. If a relay node on the old path has an UNATTACHED routing table entry for the destination, with an ATTACH ID that matches the DETACH ID in the DETACH response, then the relay node will forward the DETACH response outbound and will delete the UNATTACHED entry. The DETACH response is forwarded until it reaches the relay node which was the old parent of the lost child.

A relay node can also use a DETACH response to delete an old path to an outbound node when an ATTACH request is received which changes the outbound path. The mechanism is the same as described above.

Outbound ALERT requests are used to quickly notify a lost child that it should re-attach to the network. If a relay node receives an outbound ALERT (i.e. from its parent) request, it first checks to see if it has a routing table entry for the lost child with a "newer" ATTACH ID. If it does, then the ALERT request is simply discarded. Otherwise, a relay node which receives an outbound ALERT request will forward the ALERT request to each child node which is a relay node and will multicast the ALERT request (i.e. with a multicast MAC-D destination address) once on each of its radio ports. Each relay node adds the ALERT ID in the request to its internal alert list Records in a relay node's internal alert list in each relay node are copied into HELLO response PDUs for MAX_HELLO_LOST + 1 scheduled hello times to notify nodes to re-attach, where MAX_HELLO_LOST is the maximum number of HELLO PDUs that can be missed by a child before the child re-attaches. An alert record contains a target node ID, a source node ID, and an ALERT ID (which equates to an ATTACH ID). The concatenated source node ID and ALERT ID are used to uniquely identify each alert occurence. A target node can ignore any any duplicate alert record which is received within MAX_HELLO_LOST+5 HELLO periods.

An ALERT request may reach the super root before the associated child node re-attaches. In this case, outbound PDUs for the child node are temporarily routed using the UNATTACHED routing table entry, until the child node re-attaches. An UNATTACHED routing table entry is changed to ATTACHED whenever an inbound PDU is received from the node associated with the table entry destination. If the node re-attaches to a different branch of the spanning tree, then UNATTACHED entries for the node on its old path fragment will eventually be deleted or aged and discarded. UNATTACHED routing table entries are aged and discarded faster than ATTACHED entries.

A terminal node must set the attach indication (ATTI) bit ON in the MAC-R header of an ATTACH request when it first attaches to a new parent. The ATTI bit indicates that the path to the ATTACH request source node has changed. The ATTACH request is forwarded to the distributed root. The MAC-R entity in the WDAP which provided access to the distribution LAN for the source node posts an attach indication error to the MAC-Q sub layer when it receives the ATTACH request PDU with the ATTI bit set ON. The MAC-R sub layer in a terminal node posts an attach indication error to the MAC-Q sub layer when it receives the associated ATTACH response with the ATTI bit set ON. An attach indication is a positive indication that a node has just attached to the network and can be used to trigger an immediate (re)transmission. The attach indication includes the 802 source address and receive sequence number for the source node of the Norand Confidential

| Norand OWL Network | | |
|---|---|---|
| OWL Network Architecture | Revision 1, January 31, 1994 | page 22 |

ATTACH request. If the MAC-Q entity is holding any undelivered DATA PDUS for the node, it can respond by re-transmitting the undelivered PDUs as R-DATA PDUs. The R-DATA PDUs will be discarded if they are duplicates or arrive out-of-sequence. The R-DATA PDUs are automatically routed along the new path.

The MAC-R layer in a terminal node is responsible for retrying a DATA PDU transmission, if the MAC-D layer is unable to deliver the DATA PDU to its parent. The MAC-D layer indicates the success or failure of a transmission. Occasionally, the MAC-D entity will not be able to positively determine success or failure (i.e. if CLEAR frames are missed in a MAC-D conversation). If the MAC-D layer indicates positive failure, then the MAC-R layer can choose a (possibly new) parent, re-attach, and retransmit the DATA PDU; otherwise, the MAC-R layer must discard the PDU. The MAC-Q may retransmit the DATA PDU as an R-DATA PDU when an attach indication is received (i.e. when an ATTACH response is received with the ATTI bit set ON).

Registration.

A node is initially in an unregistered state and returns to the unregistered state under certain error conditions. Each unregistered node in the network must send a REGISTRATION request to the super root before it attaches. The REGISTRATION request is used to obtain a network node ID and is used to validate access to the network. The REGISTRATION request is returned by the super root as a REGISTRATION response. The node which originated the request is responsible for retrying the request until a matching response is received.

Registration logic is similar to attach logic with some key differeneces. REGISTRATION requests can only be sent to the super root when no other inbound PDU for the source node exists in the network. No other PDU types may be sent in the unregistered state. A node goes to the registered state when a matching registration response is received from its parent.

A node's registration is valid as long as it is actively attached to the network. A node returns to the unregistered state if it does not receive an ATTACH response within a MAX_ADDRESS_LIFETIME time period or if it detects that the super root has changed.

Broadcast routing.

PDUs with broadcast (or multicast) 802 destination addresses are (optionally) routed along all branches of the network spanning tree. Broadcast messages are transmitted to terminals immediately on radio links and are also associated with HELLO PDUs. A broadcast parameter in a HELLO response PDU indicates that terminals should stay awake for broadcast messages which will immediately follow the HELLO PDU. A secondary WDAP forwards broadcast messages onto its attached wired subnets. If a broadcast message orginates on the distribution LAN, then each primary or distributed WDAP is responsible for bridging it to the OWL sub tree for which it is the access root. Broadcast messages which originate within an OWL subnet are forwarded on each branch of the network spanning tree, except the branch on which the message arrived. The access root of the sub tree in which the broadcast message originated is responsible for bridging the message onto the distribution LAN. The message is bridged back into the radio network by each other access root.

Sleeping Terminal Support.

The MAC-R sub layer provides several facilities to support sleeping terminals. A sleeping node initially "synchronizes" on a HELLO response PDU from its parent. The node can calculate the time of the next expected HELLO response PDU from its parent and can power-down with an active timer interrupt set to wake it just before the next HELLO response PDU is transmitted. The MAC-R entity in a parent node can store a message for a sleeping node until the node "requests" the message by notifying its parent that it is awake. A terminal learns that it must request unsolicited saved messages by examining a pending message

| Norand OWL Network | | |
|---|---|---|
| OWL Network Architecture | Revision 1, January 31, 1994 | page 23 | list in the HELLO response PDU. This implementation enables sleeping terminals to receive unsolicited messages and relaxes the timing constraints for transaction oriented messages. ATTACH and DATA request PDUs can contain several MAC-R parameters which are used to enable pending messages. A "delivery service type" parameter, indicates that a terminal (i.e. which sent the request) is sleeping. An "awake time window" parameter is used to specify an awake time period. An "awake time offset" parameter is used to specify the start of the awake time window. (The awake time window is effective immediately if an awake time offset is not specified.) An "auto awake" delivery service type can be used to implicitly set an awake time window each time the parent node receives a message from the sleeping terminal. A "maximum stored message count" field specifies the maximum number of HELLO times that a message should be stored in the parent relay node. The MAC-R entity in a parent node will store pending messages until 1) the message is delivered, or 2) "maximum stored message count" hello times have expired.

Broadcast messages are associated with HELLO PDUs so that sleeping terminals will be awake when the broadcast message is transmitted.

WDAP bridging.

A WDAP maintains a forwarding data base with an entry for each known network node. Each entry contains an 802 destination address and an associated subnet identifier. When a PDU arrives at the bridging entity in a WDAP, the forwarding database is searched to determine the subnet of the 802 destination. If the destination is found and the destination is on another subnet (i.e. other than the one on which the PDU arrived) then the PDU is bridged to the subnet of the destination. If the destination is not found, then the action taken by the bridging entity is dependent on the configuration of the WDAP. 1) The PDU can be forwarded to every subnet except the subnet on which it arrived (i.e. flooding), or 2) the PDU can be discarded. Each subnet can be configured independently. For example, the subnet associated with the distribution LAN can be configured to allow flooding and the OWL subnet can be configured to disallow flooding at the same time. In this case, PDUs would be "flooded" onto the distribution LAN but would not be flooded into the OWL subnet. If the OWL subnet is configured to allow flooding, then two types of flooding are possible: 1) The PDU can be flooded throughout the OWL network spanning tree, including all secondary 802 LANs, or 2) the PDU can be routed to secondary LANs where it will be forwarded onto the secondary LAN by a secondary WDAP.

Typically a primary or distributed WDAP is configured to only forward unicast frames from the distribution LAN to the OWL subnet if an entry exists in its MAC-R routing table for the 802 destination. This implies that the MAC-R entity must notify the bridging entity that a destination exists in the radio subnet, when a MAC-R routing table entry is created, so that the bridging entity can update its forwarding database. Likewise, the bridging entity must be notified when a routing table entry is deleted. The forwarding database in a distributed WDAP contains entries for each node in its access spanning tree. The forwarding database in the primary WDAP contains entries for all nodes in the OWL subnet which are not in an access sub tree rooted by a distributed WDAP.

Optimization considerations.

If a primary or distributed WDAP has two subnets - a distribution LAN and the OWL subnet - and the WDAP is configured to allow flooding onto the distribution LAN and to not allow flooding onto the OWL subnet, then each entry in its forwarding database corresponds to an entry in its MAC-R routing table. All frames which are passed to the bridging entity from the MAC-R entity (i.e. from the OWL subnet), are forwarded to the distribution LAN. Frames will only be forwarded from the distribution LAN to the OWL subnet if an entry exists in the MAC-R routing table. For any configuration, entries in the forwarding database which are associated with the OWL subnet correspond to entries in the MAC-R routing table. A shared forwarding database/MAC-R routing table data structure could be used to optimize the learning process required for bridging and to avoid two lookups (i.e. a forwarding database lookup and a MAC-R routing table lookup) each time a PDU is forwarded from the distribution LAN into the OWL subnet.

Norand Confidential

| Norand OWL Network | | |
|---|---|---|
| OWL Network Architecture | Revision 1, January 31, 1994 | page 24 |

MAC-Q Sub layer.

The (optional) MAC-Q can be viewed as an end-to-end reliability layer between entry points to the radio network. The MAC-Q sub layer is responsible for delivering received PDUs to the next higher layer in the order in which the PDUs entered the radio network. The MAC-Q sub layer also retransmits lost MQPDUs, and filters any resulting duplicate or out-of-sequence MQPDUs. The MAC-Q sub layer is intended to significantly reduce the number of lost PDUs due to "roaming" terminals, without introducing duplicate or out-of-sequence PDUs. It does not guarantee that PDUs will never be lost. MAC-Q entities exist at entry points to the radio network. The MAC-Q entity in a WDAP provides a proxy MAC-Q layer for nodes in the OWL network which are not in the radio network.

MQPDUs contain a MQPDUID in the MQPDU header. The concatenation of the MQPDUID and 802 source and destination addresses uniquely identifies an MQPDU in an OWL radio network. The MQPDUID is generated by the MAC-Q entity in a WDAP or terminal when a frame first enters the OWL radio network.

A primary or distributed WDAP maintains an "MQPDU table" with entries for each outbound node. Each entry contains the 802 address of an outbound node and an associated forward MQPDUID and filter MQPDUID. Forward MQPDUIDs are generated to uniquely identify an MQPDU for its lifetime in the OWL network. Filter MQPDUIDs are used to detect duplicate and out-of-sequence PDUs. Before a primary or distributed WDAP forwards an 802 frame from a wired backbone into the OWL radio network, it increments the forward MQPDUID, associated with the destination 802 address, and enters the it into the MQPDU header. The MQPDU is then passed to the MAC-R sub layer for transmission. Note that this approach assumes that remote stations do not move quickly from subnet to subnet. If a node is physically attached to two subnets, then a unique 802 address should be used for each subnet.

Terminal nodes maintain an MQPDU table with an entry for each active remote MAC-Q network entry point. Each entry contains a filter MQPDUID, a subnet identifier, and an 802 address. Subnet 0 is always the radio network and subnet 1 is the distribution LAN. Other subnet identifiers can be assigned to a secondary WDAP. The 802 address is blank for subnets 1 and higher. Note that there can be multiple entries for subnet 0, but only 1 entry for each other subnet. A terminal also maintains a single forward MQPDUID variable and stores up to one MQPDU for possible retransmission. The value of the forward variable is incremented and entered into the MQPDU header whenever a terminal prepares a new PDU for transmission. The terminal MAC-Q entity retransmits an MQPDU whenever the MAC-R layer returns a transmit error (until a maximum retry count is exceeded).

The filter MQPDUID, in an MQPDU table, is the ID of the last MQPDU received from the associated 802 address. Duplicate MQPDUs are discarded. An MQPDU is accepted by a sink if 1) a retry bit in the MAC-Q header is set OFF or if 2) the MQPDUID in the PDU is not in a "duplicate range" defined by the filter MQPDUID in the table. If an MQPDU table filter entry does not exist for an 802 source address, then data PDUs from the source should be discarded if the retry bit is set ON. The entries in the MQPDU table must be aged so that a filter MQPDUID (and stored MQPDU) is never older than the "roll over" time of an MQPDUID.

An entry in an MQPDU table in a distributed WDAP may be transferred to another primary or distributed WDAP if a terminal "roams". If a terminal moves and its new path to the super root is through another WDAP, then the forward and filter MQPDUIDs for the terminal must be transferred from the old WDAP to the new WDAP. The super root obtains the information (if it exists) from the old WDAP and forwards it to the new WDAP. Note that the new WDAP can accept MQPDUs with the retry bit set OFF while waiting for an MQPDU table entry to be transferred.

Ideally, each MAC-Q entity in the radio network should be notified when the terminal node associated with an entry in its forward list has roamed and re-attached. If a MAC-Q entity holds an undelivered PDU, destined for the re-attached terminal, then the PDU can be retransmitted along the new path to the terminal.

Norand Confidential

| Norand OWL Network | | |
|---|---|---|
| OWL Network Architecture | Revision 1, January 31, 1994 | page 25 |

A more practical approach would be to notify each MAC-Q entity which has recently transitted a PDU to the terminal. If it is assumed that most traffic is not contained in the radio network, but rather is directed to or from the distribution LAN, then it may be practical to simply notify the MAC-Q entities in primary or distributed WDAPs on the old path to the terminal.

MAC-S Sub Layer.

The (optional) MAC-S sub layer provides data compression and security services.

Network management tools can be used to create security associations between any two stations in an 802 LAN which contains an owl subnet. MAC-S entities exist in WDAP's. A MAC-S entity can encipher a frame when it enters the radio network if a security association exists between the source and destination stations at the entry WDAP. A MAC-S entity, in an exit WDAP, can correctly decipher a frame as it exits the radio network if it contains a corresponding security association. Network management access to a MAC-S entity in a distributed WDAP is always through a primary WDAP. The primary WDAP (i.e. the super root) "knows" the path to all outbound nodes. A MAC-S entity in a primary or secondary WDAP provides a "proxy" MAC-S layer for security associations involving remote stations on wired subnets.

A global security association can be used to consistently encipher and decipher each frame as it, respectively, enters and exits the radio network. Global association must be enabled at the MAC-S entity in each primary, secondary, and terminal node in the OWL subnet.

Simple compression (i.e. independent of any security encryption) is enabled by a single compression bit in the MAC-S header.

Norand Confidential

APPENDIX B

| NORAND SST NETWORK PROTOCOL FRAME FORMAT SPECIFICATION | REVISION 1, 03/10/94 | PAGE 1 |
|---|---|---|

SSTE NETWORK FRAME FORMATS

NORAND CONFIDENTIAL

| NORAND SST NETWORK PROTOCOL FRAME FORMAT SPECIFICATION | REVISION 1, 03/10/94 | PAGE 2 |
|---|---|---|

General format.

| Pre-amble | Flag | MAC-D Header | MAC-R Header | MAC-R Parms | MAC-Q Header | LLC Header | LLC Data | CRC | Flag |
|---|---|---|---|---|---|---|---|---|---|

General Field Definitions for a data PDU.

| Preamble | 1 to 8 bytes |
|---|---|
| Flag start delimiter | 1 byte |
| MAC-D Protocol ID | 1 byte |
| MAC-D Network ID | 1 byte |
| MAC-D Destination Address | 2 bytes |
| MAC-D Source Address | 2 bytes |
| MAC-D Control | 1 byte |
| MAC-D Channel Reservation | 1 byte |
| MAC-R Control | 2 bytes |
| MAC-R 802 Destination Address | 6 bytes |
| MAC-R 802 Source Address | 6 bytes |
| MAC-R PDU type specific fields | PDU type dependent |
| MAC-R Optional Parms | M bytes |
| MAC-Q Control | 1 byte |
| MAC-Q Sequence | 1 byte |
| LLC DSAP | 1 byte |
| LLC SSAP | 1 byte |
| LLC Control | 1 bytes |
| optional SNAP header | 5 bytes |
| LLC Data | N bytes |
| CRC-CCITT | 2 bytes |
| Flag end delimiter | 1 byte |
| (optional trailer) | 1 or 2 bytes |

16-bit Network Address Format.

| bit 15 | Mulitcast Flag |
|---|---|
| 0 | unicast frame |
| 1 | multicast or broadcast frame |

| bit 14-13 | Node Type |
|---|---|
| 00 | Terminal |
| 01 | Acess Point |
| 11 | All Nodes |

| bit 12-0 | Node Identifier |
|---|---|

NORAND CONFIDENTIAL

| NORAND SST NETWORK | | |
|---|---|---|
| PROTOCOL FRAME FORMAT SPECIFICATION REVISION 1, 03/10/94 | | PAGE 3 |

| all 0's | root node identifer |
|---|---|
| all 1's | node without a network node identifier or any node |

| bit 2-0 | Port Identifier for Access Point |
|---|---|
| all 1's | any port |

Hexidecimal 2000 is the well-known 16-bit address of the root node.
Hexidecimal 9FFF is the multicast address of a terminal node.
Hexidecimal BFFF is the multicast address of an access point.
Hexidecimal FFFF is the broadcast address for all nodes.

MAC-D Control Byte (8 bits).*

Bits 7-4 in the MAC-D control byte are used to specify the frame type. A MAC-D PDU is classified as either a request or poll frame, depending on the state of the R/P bit. Poll frames are always control frames. A request MAC-D PDU can be either a control or data frame, depending on the state of the CONTROL bit.

Data frames.

*Data request control byte.*

| bit 7 | REQUEST | 0 = request frame |
|---|---|---|
| bit 6 | CONTROL | 0 = data frame |
| bit 5 | START | 1 = first-in-chain |
| bit 4 | STOP | 1 = last-in-chain |
| bit 3 | SEQ | sequence number, modulo 2 |
| bit 2-0 | (reserved) | must be zero |

The START bit is set ON in the first frame fragment in a series of fragments associated with a single MAC-D PDU.

The STOP bit is set ON in the last frame fragment in a series of fragments associated with a single MAC-D PDU.

Control frames.

*Request control byte.*

| bit 7 | REQUEST | 0 = request frame |
|---|---|---|
| bit 6 | CONTROL | 1 = control frame |
| bit 5-4 | Control frame type | 10 = RFP<br>00 = ENQ<br>01 = ABORT |
| bit 3-0 | (reserved) | must be zero |

NORAND CONFIDENTIAL

| NORAND SST NETWORK | | |
|---|---|---|
| PROTOCOL FRAME FORMAT SPECIFICATION | REVISION 1, 03/10/94 | PAGE 4 |

*Poll control byte.*

| bit 7-6 | POLL | 10 = poll frame |
|---|---|---|
| bit 5-4 | Poll frame type | 00 = WAIT<br>01 = REJECT<br>10 = CLEAR<br>11 = POLL |
| bit 3 | SEQ | sequence number, modulo 2 |
| bit 2-0 | (reserved) | must be zero |

MAC-R Control Bytes (16 bits).

| bit 15 | Network type | 0 = hierarchical, 1 = point-to-point |
|---|---|---|
| bit 14 | (reserved) | must be zero |
| bit 13 | Outbound Flag | 1 = outbound |
| bit 12 | REQ/RSP | 0 = request, 1 = response |
| bit 11 | (reserved) | must be zero |
| bit 10-8 | MAC-R PDU Type | (see table below) |
| bit 7 | MAC-R Parms Flag | 1 = optional MAC-R parms |
| bit 6-3 | (reserved) | must be zero |
| bit 2 | ATTI | 1 = attach indication |
| bit 1 | Relay flag | 0=from a child, 1=relayed PDU |
| bit 0 | Bridging Flag | 1 = distributed |

MAC-R PDU Types.

| 000 | Data/R-Data PDU |
|---|---|
| 001 | (reserved) |
| 010 | Hello PDU |
| 011 | Attach PDU |
| 100 | Alert/Detach PDU |
| 101 | ARP PDU |
| 110 | Registration PDU |
| 111 | (reserved) |

Optional Bridge Parameters - general format.

| 1-bit end-of-parms flag | 1 = last optional parm |
|---|---|
| 7-bit parm type | (see table below) |
| 1-byte parm length | length of parm value field in bytes |
| M-byte parm value | (value or list of values) |

NORAND CONFIDENTIAL

| NORAND SST NETWORK | | |
|---|---|---|
| PROTOCOL FRAME FORMAT SPECIFICATION REVISION 1, 03/10/94 | | PAGE 5 |

Optional Parameters.

| Parm Type | Parm Length | Description |
|---|---|---|
| 02h | 6 bytes | 802 address. |
| 03h | M*2 | Decendant List. A list of 2-byte addresses. |
| 04h | N*5 | Alert List. A list of 4-byte alert records. Each record consists of a 2-byte node ID followed by a 2-byte alert ID. The alert ID corresponds to an attach ID. |
| 05h | P*2 | Pending Message List. A list of 2-byte addresses. |
| 06h | 2 bytes | Distance (cost) from the root. |
| 07h | Q bytes | Well-known alias. |
| 08h | R bytes | Forward List. A list of 2-byte addresses. |
| 09h | 1 byte | Load Indicator. An indication of the channel load based on frame frequency. |
| 0Ah | S bytes | Well-known alias of the root. |
| 0Bh | 6 bytes | 802 address of the root. |
| 0Ch* | 1 or 2 bytes | Awake time (in 100 millisecond units). All 1's denotes forever. |
| 0Dh* | 1 or 2 bytes | Awake time offset (in 100 millisecond units). An awake time offset of 0 specifies immediate delivery, even if no awake time is specified. |
| 0Eh* | 1 byte | Delivery service type.<br><br>0=deliver immediately.<br>1=store until the node is awake.<br>2=store until the node is awake; automatically set awake time.<br>3=attempt to deliver immediately, then store until the node is awake. |
| 0Fh* | 1 byte | Maximum stored message count. The maximum number of hello times that the parent node should store a message for the source child node. |
| 10h | 2 bytes | Decendent count. |
| 11h | 2 bytes | Device Identifier. |
| 12h | 4 bytes | Distributed Clock |

*Delivery service and awake time parameters (0C, 0D, 0E and 0F) are processed for all unicast messages.

NORAND CONFIDENTIAL

| NORAND SST NETWORK | | |
|---|---|---|
| PROTOCOL FRAME FORMAT SPECIFICATION | REVISION 1, 03/10/94 | PAGE 6 |

MAC-R Request Packet Formats.

Data (Type 000).

| MAC-D Header | |
|---|---|
| MAC-R Header | |
| Optional Parms<br>- Max. stored message count.<br>- Delivery service type.<br>- Wake up time.<br>- Wake up time offset. | N bytes |
| MAC-Q Control Byte | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

Alert (Type 100).

| MAC-D Header | |
|---|---|
| MAC-R Header | |
| Alert ID | 2 bytes |
| Alert Age | 2 bytes |
| Optional Parms | N bytes |

NORAND CONFIDENTIAL

| Norand SST Network | | |
|---|---|---|
| Protocol Frame Format Specification | Revision 1, 03/10/94 | Page 7 |

Hello (Type 010).

| MAC-D Header | |
|---|---|
| MAC-R Header | |
| Optional Parms | N bytes |

Attach (Type 011).

| MAC-D Header | |
|---|---|
| MAC-R Header | |
| Attach ID | 2 bytes |
| Optional Parms<br>- Max. stored message count.<br>- Delivery service type.<br>- Wake up time.<br>- Wake up time offset. | N bytes |
| MAC-Q Control Byte | 1 byte |
| MAC-Q Send Sequence | 1 byte |
| MAC-Q Receive Sequence | 1 byte |

Address Resolution (Type 101).

| MAC-D Header | |
|---|---|
| MAC-R Header | |
| Access Code | 4 bytes<br><br>(must be 0 if no access code is used) |
| ARP Operation<br><br>bit 7-6  operation<br><br><br><br>bit 5-0  (reserved) | 1 byte<br><br>00=lookup alias<br>01=lookup 802 address<br>10=lookup 16-bit address |
| Reason Code | 1 byte |
| 16-bit Network Address | 2 bytes |
| 802 Address | 6 bytes |
| Alias type (07h)* | 1 byte |
| Alias length | 1 byte |
| Alias | N bytes |

*The alias fields are optional. If an 802 address lookup or alias lookup fails, then the 16-bit address will be set to all 1's in the response PDU. If a 16-bit address lookup fails, then the 802 address will be set to all 1's in the response PDU.

NORAND CONFIDENTIAL

| NORAND SST NETWORK PROTOCOL FRAME FORMAT SPECIFICATION | REVISION 1, 03/10/94 | PAGE 8 |

Registration (Type 110).

| MAC-D Header | |
|---|---|
| MAC-R Header | |
| Access Code | 4 bytes |
| | (must be 0 if no access code is used) |
| REGISTRATION Operation | 1 byte |
| bit 7    New Alias | 1 = replace existing Alias |
| bit 6    New 802 address | 1 = replace existing 802 address |
| bit 5-0  (reserved) | must be zero |
| Reason Code | 1 byte |
| 16-bit Network Address | 2 bytes |
| 802 Address | 6 bytes |
| Alias type (07h) | 1 byte |
| Alias length | 1 byte |
| Alias | N bytes |
| Device ID type (11h) | 1 byte |
| Device ID length | 1 byte |
| Device ID | 2 bytes |

The 802 address field contains the 802 address of the node which initiated the REGISTRATION request. The network address must be set to the multicast address for the node type (i.e. BFFF or 9FFF). The optional alias field can contain a 1 to 16-byte node name. The optional device ID field can contain a 2-byte device identifier. The address server will set the network address field to the next available block of addresses, for the node type, in the response PDU. If an address block is not available, the field will be set to all 1's. Access points are allocated a block of 8 sequential addresses which start at the returned address. Terminals are allocated a single address. Note that the MAC-D source address is the multicast address address for the node type (i.e. BFFF or 9FFF).

Bridge Response Packet Formats.

R-Data (Type 000).

| MAC-D Header | |
|---|---|
| MAC-R Header | |
| Optional Parms | N bytes |
| - Max. stored message count. | |
| - Delivery service type. | |
| - Wake up time. | |
| - Wake up time offset. | |
| MAC-Q Control Byte | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

NORAND CONFIDENTIAL

| NORAND SST NETWORK PROTOCOL FRAME FORMAT SPECIFICATION | REVISION 1, 03/10/94 | PAGE 9 |

Detach (Type 100).

| MAC-D Header | |
|---|---|
| MAC-R Header | |
| Detach ID | 2 bytes |
| Detach Age | 2 bytes |
| Optional Parms | N bytes |

Hello (Type 010).

| MAC-D Header | |
|---|---|
| MAC-R Header | |
| Cost-to-root | 2 bytes (0xFFFF = infinity) |
| Hello Seed | 1 byte |
| Offset | 1 byte<br><br>0-254 = transmission offset time in hundredths of seconds.<br>255 = unscheduled. |
| Root Priority | 1 byte |
| Root Sequence Number | 1 byte |
| Root 802 Address | 6 bytes |
| HELLO Period | 1 byte (20 = 2 seconds) |
| Optional parms<br>- Pending Message List<br>- Alert List<br>- Load Indicator<br>- Distributed Clock | N bytes |

| NORAND SST NETWORK | | |
| --- | --- | --- |
| PROTOCOL FRAME FORMAT SPECIFICATION | REVISION 1, 03/10/94 | PAGE 10 |

Attach (Type 011).

| MAC-D Header | |
| --- | --- |
| MAC-R Header | |
| Attach ID | 2 bytes |
| Optional Parms | N bytes |
| MAC-Q Control Byte | 1 byte |
| MAC-Q Send Sequence | 1 byte |
| MAC-Q Receive Sequence | 1 byte |

Address Resolution (Type 101).*

| MAC-D Header | |
| --- | --- |
| MAC-R Header | |
| Access Code | 4 bytes<br><br>(must be 0 if no access code is used) |
| ARP Operation<br><br>bit 7-6   operation<br><br><br>bit 5-0   (reserved) | 1 byte<br><br>00=lookup alias<br>01=lookup 802 address<br>10=lookup 16-bit address |
| Reason Code | 1 byte |
| 16-bit Network Address | 2 bytes |
| 802 Address | 6 bytes |
| Alias type (07h)* | 1 byte |
| Alias length | 1 byte |
| Alias | N bytes |
| Device ID type (11h) | 1 byte |
| Device ID length | 1 byte |
| Device ID | 1 byte |

If an 802 address lookup or alias lookup fails, then the 16-bit address will be set to all 1's in the response PDU. If a 16-bit address lookup fails, then the 802 address will be set to all 1's in the response PDU. The alias and device ID will be returned as optional parameters.

NORAND CONFIDENTIAL

| NORAND SST NETWORK PROTOCOL FRAME FORMAT SPECIFICATION | REVISION 1, 03/10/94 | PAGE 11 |
|---|---|---|

Registration (Type 110).*

| MAC-D Header | |
|---|---|
| MAC-R Header | |
| Access Code | 4 bytes<br><br>(must be 0 if no access code is used) |
| REGISTRATION Operation<br><br>bit 7　New Alias<br>bit 6　New 802 address<br>bit 5-0　(reserved) | 1 byte<br><br>1 = replace existing Alias<br>1 = replace existing 802 address<br>must be zero |
| Reason Code | 1 byte |
| 16-bit Network Address | 2 bytes |
| 802 address | 6 bytes |
| Alias type (07h) | 1 byte |
| Alias length | 1 byte |
| Alias | N bytes |
| Device ID type (11h) | 1 byte |
| Device ID length | 1 byte |
| Device ID | 2 bytes |

The 802 address, optional alias, and optional device ID fields are the same as in the associated registration request. The network address field contains a 16-bit address, for the node type, if the reason code is 0; otherwise, the field will be set to all 1's. Access points are allocated a block of 8 sequential addresses, which start at the returned address. Note that the MAC-D destination address is the multicast address address for the node type (i.e. BFFF or 9FFF).

MAC-Q Control Byte (8 bits).

| bit 7 | Retry | 1=retry |
|---|---|---|
| bit 6 | ATTI | 1=attach indication |
| bit 5-4 | (reserved) | must be zero |
| bit 3-0 | Subnet ID | 0000 = radio network, 0001 = distribution LAN, 0010-1110 = secondary LAN. |

MAC-Q Packet Format.

| MAC-D Header | |
|---|---|
| MAC-R Header | |
| MAC-Q Control | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

NORAND CONFIDENTIAL

What is claimed is:

1. A communication system comprising:
   a hard-wired communication network having a plurality of wired communication devices attached thereto, each of said plurality of wired communication devices communicating data as prescribed by a first communication protocol, and having a unique identifier for communicating data;
   a wireless communication network having a plurality of wireless communication devices participating thereon in a hierarchical arrangement, each of said plurality of wireless communication devices communicating data as prescribed by a second communication protocol, and having a unique identifier for communicating data;
   one of said plurality of wired communication devices comprises a wired access point which participates on the wireless communication network via the second communication protocol; and
   when any one of said plurality of wired communication devices or said plurality of wireless communication devices communicates data to any other of said plurality of wired communication devices or said plurality of wireless communication devices, said any one of said plurality of wired communication devices or said plurality of wireless communication devices associates the unique identifier of the any other of said plurality of wired communication devices or said plurality of wireless communication devices with the data communicated for use by the first and second communication protocols for routing of the data to the any other of said plurality of wired communication devices or said plurality of wireless communication devices.

2. The communication system of claim 1 wherein said plurality of hard wired communication devices and said plurality of wireless communication devices, together, form a spanning tree.

3. The communication system of claim 1 wherein the wired access point utilizes a table that identifies routing pathways based on the unique identifier.

4. The communication system of claim 1 wherein the wired access point participates to maintain the consistency of the table.

5. The communication system of claim 1 wherein one of said plurality of wireless communication devices comprises a wireless access point which participates on the wireless communication network via the second communication protocol.

6. The communication system of claim 5 wherein the wireless access point couples with the hard-wired communication network via the wired access point.

7. The communication system of claim 6 wherein the wired access point and the wireless access point participate in the wireless communication network in the hierarchical arrangement by routing communications between the wired access point and the wireless access point.

8. The communication system of claim 1 wherein one of said plurality of wireless communication devices comprises a first wireless computing device.

9. The communication system of claim 8 wherein one of said plurality of wireless communication devices comprises a second wireless computing device, and the first and second wireless computing devices and the wired access point participate in the wireless communication network in the hierarchical arrangement by routing communications between the first and second wireless computing devices through the wired access point.

10. The communication system of claim 1 wherein one of said plurality of wireless communication devices comprises a wireless roaming device.

11. The communication system of claim 10 wherein the wired access point utilizes a table that identifies routing pathways based on the unique identifier.

12. A communication system comprising:
    a hard-wired communication network having a plurality of wired communication devices attached thereto, each of said plurality of wired communication devices communicating data as prescribed by a first communication protocol, and having a unique identifier for communicating data;
    a wireless communication network having a plurality of wireless communication devices participating thereon, each of said plurality of wireless communication devices communicating data as prescribed by a second communication protocol, and having a unique identifier for communicating data;
    said plurality of wired communication devices comprises a plurality of wired access points that each participate on the wireless communication network via the second communication protocol utilizing a locally stored table that indexes at least a portion of the unique identifiers;
    at least one of the plurality of wireless communication devices seeks permission from one of the plurality of wired access points before communicating data; and
    when any one of said plurality of wired communication devices or said plurality of wireless communication devices communicates with any other of said plurality of wired communication devices or said plurality of wireless communication devices, said any one of said plurality of wired communication devices or said plurality of wireless communication devices includes the unique identifier of the any other of said plurality of wired communication devices or said plurality of wireless communication devices with the communication for use by the first and second communication protocols in routing the communication to the any other of said plurality of wired communication devices or said plurality of wireless communication devices.

13. The communication system of claim 12 wherein said plurality of hard wired communication devices and said plurality of wireless communication devices, together, participate in a spanning tree.

14. The communication system of claim 12 wherein the routing tables stored in each of the wired access points are dynamically adjusted.

15. The communication system of claim 14 wherein said plurality of wireless communication devices further comprises a plurality of wireless roaming devices, and the routing tables are dynamically adjusted to support roaming by the plurality of wireless roaming devices.

16. The communication system of claim 12 wherein said plurality of wireless communication devices comprises a wireless access point which participates on the wireless communication network via the second communication protocol.

17. The communication system of claim 16 wherein the wireless access point couples with the hard-wired communication network via one of the plurality of wired access points.

18. The communication system of claim 17 wherein the plurality of wireless communication devices further comprises a plurality of wireless computing devices, and the wireless access point and the plurality of wired access points support communication between the plurality of wireless computing devices.

19. The communication system of claim 12 wherein the plurality of wireless communication devices comprises a plurality of wireless computing devices, and the plurality of wired access points support communication between the plurality of wireless computing devices.

20. The communication system of claim 12 wherein each of the plurality of wireless communication devices dynamically selects at least one of the plurality of wired access points from others of the plurality of wired access points to provide coupling with the wired communication network.

21. A communication system comprising:

a hard-wired communication network having a plurality of wired communication devices attached thereto, each of said plurality of wired communication devices communicating data as prescribed by a first communication protocol, and having a unique identifier for communicating data;

a wireless communication network having a plurality of wireless communication devices participating thereon, each of said plurality of wireless communication devices communicating data as prescribed by a second communication protocol, and having a unique identifier for communicating data;

said plurality of wired communication devices comprises a plurality of wired access points that each participate on the wireless communication network via the second communication protocol utilizing a locally stored table that indexes at least a portion of the unique identifiers;

each of the plurality of wireless communication devices dynamically selects at least one of the plurality of wired access points from others of the plurality of wired access points to provide coupling with the wired communication network; and when any one of said plurality of wired communication devices or said plurality of wireless communication devices communicates data to any other of said plurality of wired communication devices or said plurality of wireless communication devices, said any one of said plurality of wired communication devices or said plurality of wireless communication devices includes the unique identifier of the any other of said plurality of wired communication devices or said plurality of wireless communication devices with the data for use by the first and second communication protocols in routing the data to the any other of said plurality of wired communication devices or said plurality of wireless communication devices.

22. The communication system of claim 21 wherein said plurality of hard wired communication devices and said plurality of wireless communication devices, together, participate in a spanning tree.

23. The communication system of claim 22 wherein the tables stored in each of the wired access points are dynamically adjusted.

24. The communication system of claim 23 wherein said plurality of wireless communication devices further comprises a plurality of wireless roaming devices, and the tables are dynamically adjusted to support roaming by the plurality of wireless roaming devices.

25. The communication system of claim 21 wherein said plurality of wireless communication devices comprises a wireless access point which participates on the wireless communication network via the second communication protocol.

26. The communication system of claim 21 wherein the wireless access point couples with the hard-wired communication network via one of the plurality of wired access points.

27. The communication system of claim 26 wherein the plurality of wireless communication devices further comprises a plurality of wireless computing devices, and the wireless access point and the plurality of wired access points support communication between the plurality of wireless computing devices.

28. The communication system of claim 21 wherein the plurality of wireless communication devices comprises a plurality of wireless computing devices, and the plurality of wired access points support communication between the plurality of wireless computing devices.

29. The communication system of claim 21 wherein at least one of the plurality of wireless communication devices seeks permission from one of the plurality of wired access points before communicating data.

* * * * *